US007437366B2

(12) United States Patent
Matsuzawa et al.

(10) Patent No.: US 7,437,366 B2
(45) Date of Patent: Oct. 14, 2008

(54) DOCUMENT MANAGEMENT SYSTEM HAVING DOCUMENT TRANSMISSION DEVICE, DOCUMENT MANAGEMENT SERVER, AND DOCUMENT MANAGEMENT CLIENT

(75) Inventors: Noriko Matsuzawa, Soka (JP); Takayuki Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 11/003,436

(22) Filed: Dec. 6, 2004

(65) Prior Publication Data
US 2005/0131907 A1 Jun. 16, 2005

(30) Foreign Application Priority Data
Dec. 12, 2003 (JP) ............................. 2003-414327

(51) Int. Cl.
*G06F 7/00* (2006.01)
*G06F 17/30* (2006.01)
(52) U.S. Cl. ........................................................ 707/10
(58) Field of Classification Search ................... 707/10; 717/178, 173; 382/100; 345/619; 715/500; 709/100, 203
See application file for complete search history.

(56) References Cited
U.S. PATENT DOCUMENTS

| | | | | |
|---|---|---|---|---|
| 6,775,023 | B1 * | 8/2004 | Fukunaga et al. | 358/1.15 |
| 6,980,668 | B1 * | 12/2005 | Naito et al. | 382/100 |
| 7,046,258 | B1 * | 5/2006 | Naito et al. | 345/619 |
| 7,117,493 | B2 * | 10/2006 | Matsushima | 717/173 |
| 7,191,212 | B2 * | 3/2007 | Hirai | 709/203 |
| 7,271,928 | B2 * | 9/2007 | Naito et al. | 358/1.15 |
| 2001/0015823 | A1 | 8/2001 | Sato | 358/1.15 |
| 2002/0032714 | A1 * | 3/2002 | Monobe | 709/100 |
| 2002/0144257 | A1 * | 10/2002 | Matsushima | 717/178 |
| 2003/0051208 | A1 * | 3/2003 | Todaka et al. | 715/500 |

FOREIGN PATENT DOCUMENTS

| | | |
|---|---|---|
| JP | 2001-358857 | 12/2001 |
| JP | 2003-085178 | 3/2003 |

* cited by examiner

*Primary Examiner*—Hung T Vy
(74) *Attorney, Agent, or Firm*—Fitzpatrick, Cella, Harper & Scinto

(57) ABSTRACT

In a control method for a document management system in which a document transmission device capable of transmitting image data, a document management server of associating image data with a folder as a document and storing and managing the associated image data and folder, and a document management client of browsing the image data of the stored document are connected through a network the server receives and stores registration control information for controlling a document registration process, from the client, transmits the stored registration control information to the device, based on a registration control information acquisition request transmitted from the device, and receives, from the device, the transmitted and designated registration control information and the image data, and stores the received image data as the document on the basis of the received registration control information. Thus, it is possible to easily manage the registration control information.

7 Claims, 22 Drawing Sheets

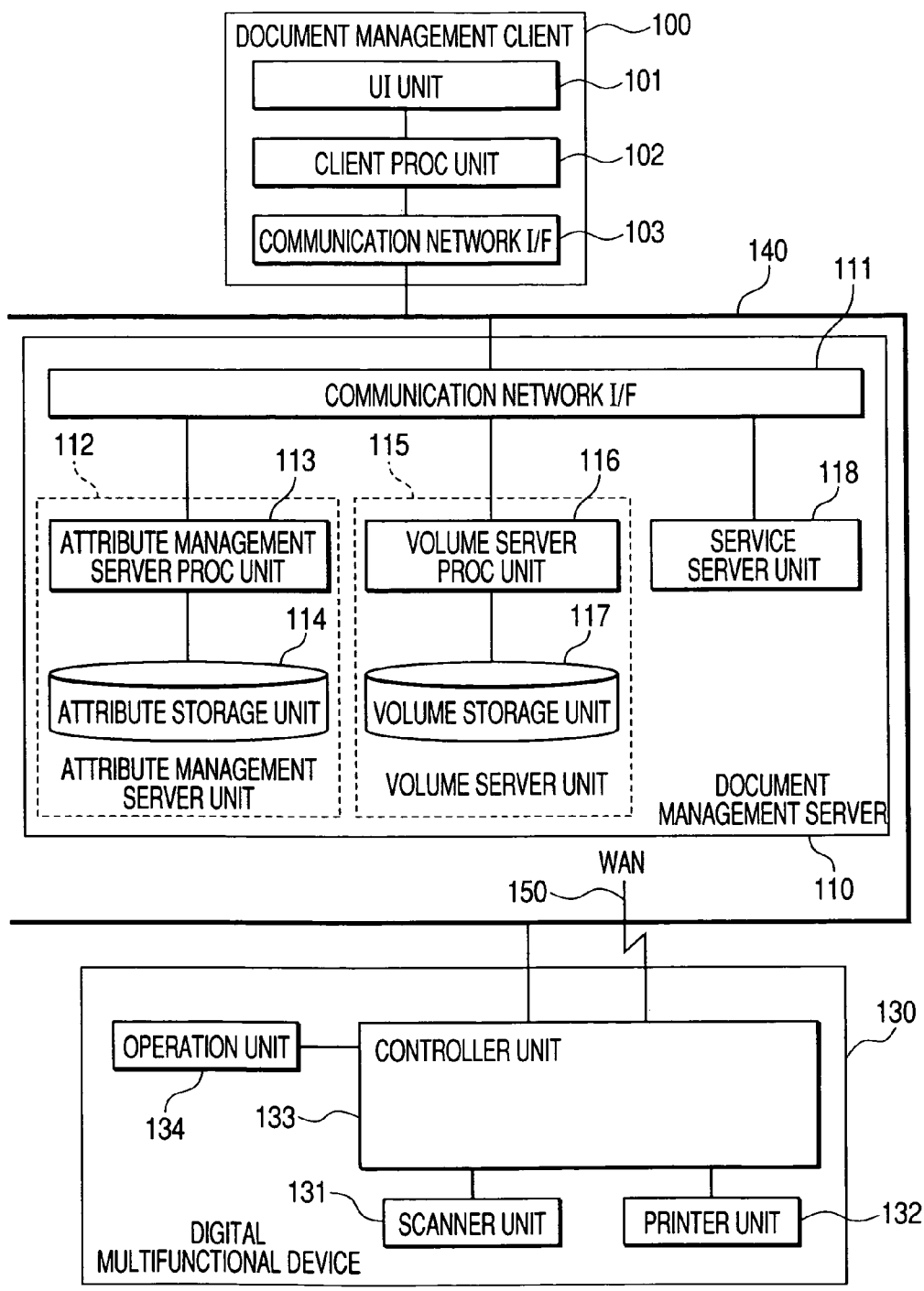

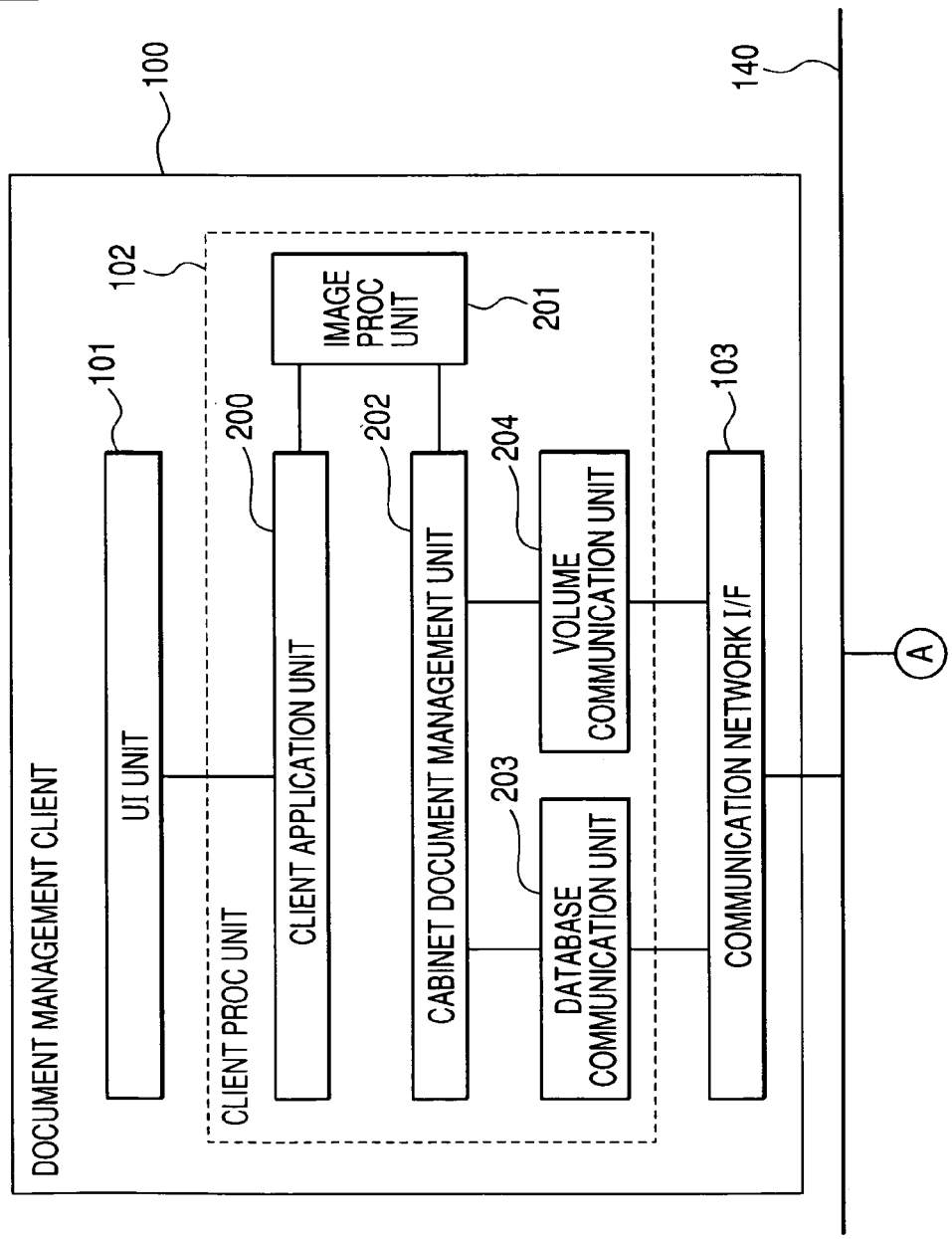

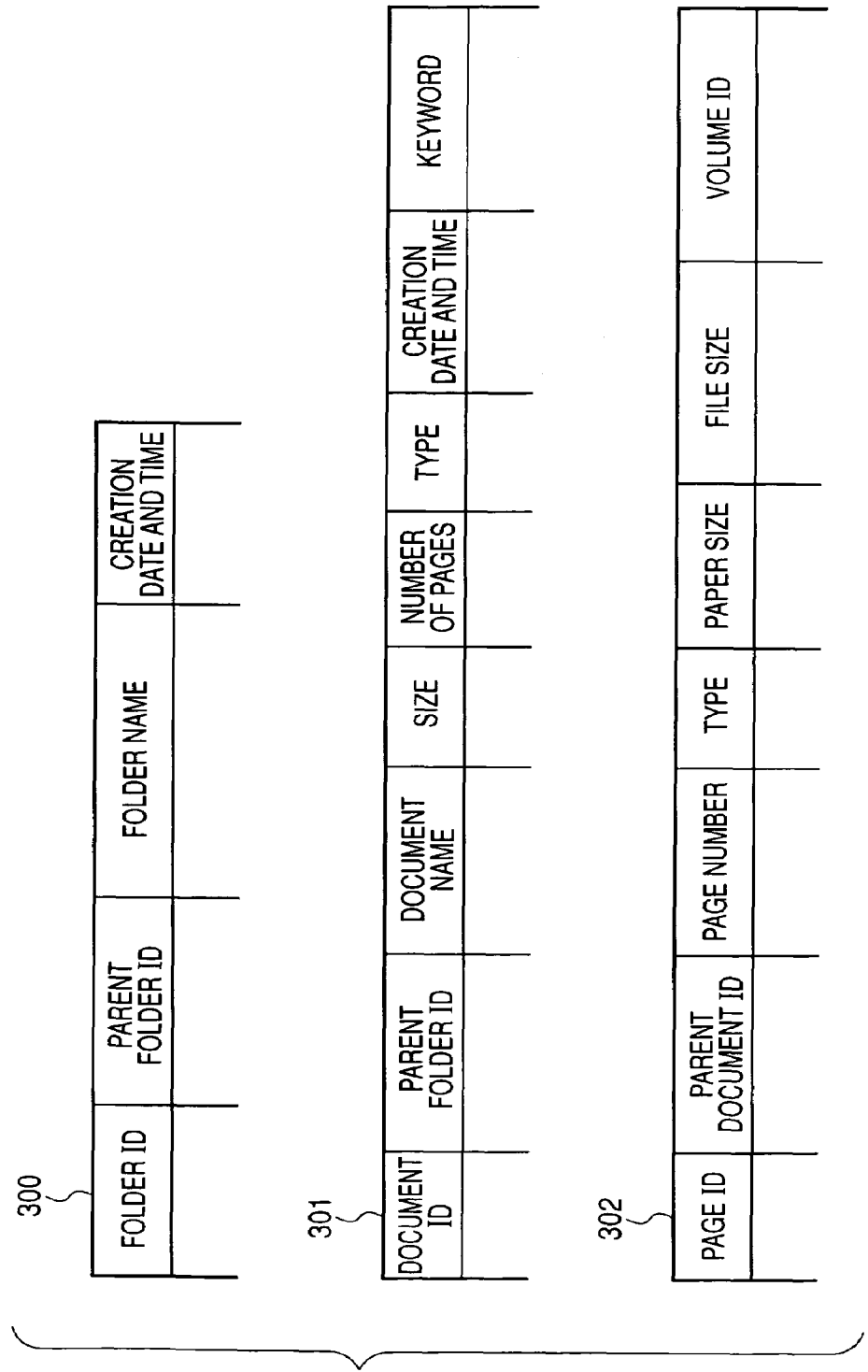

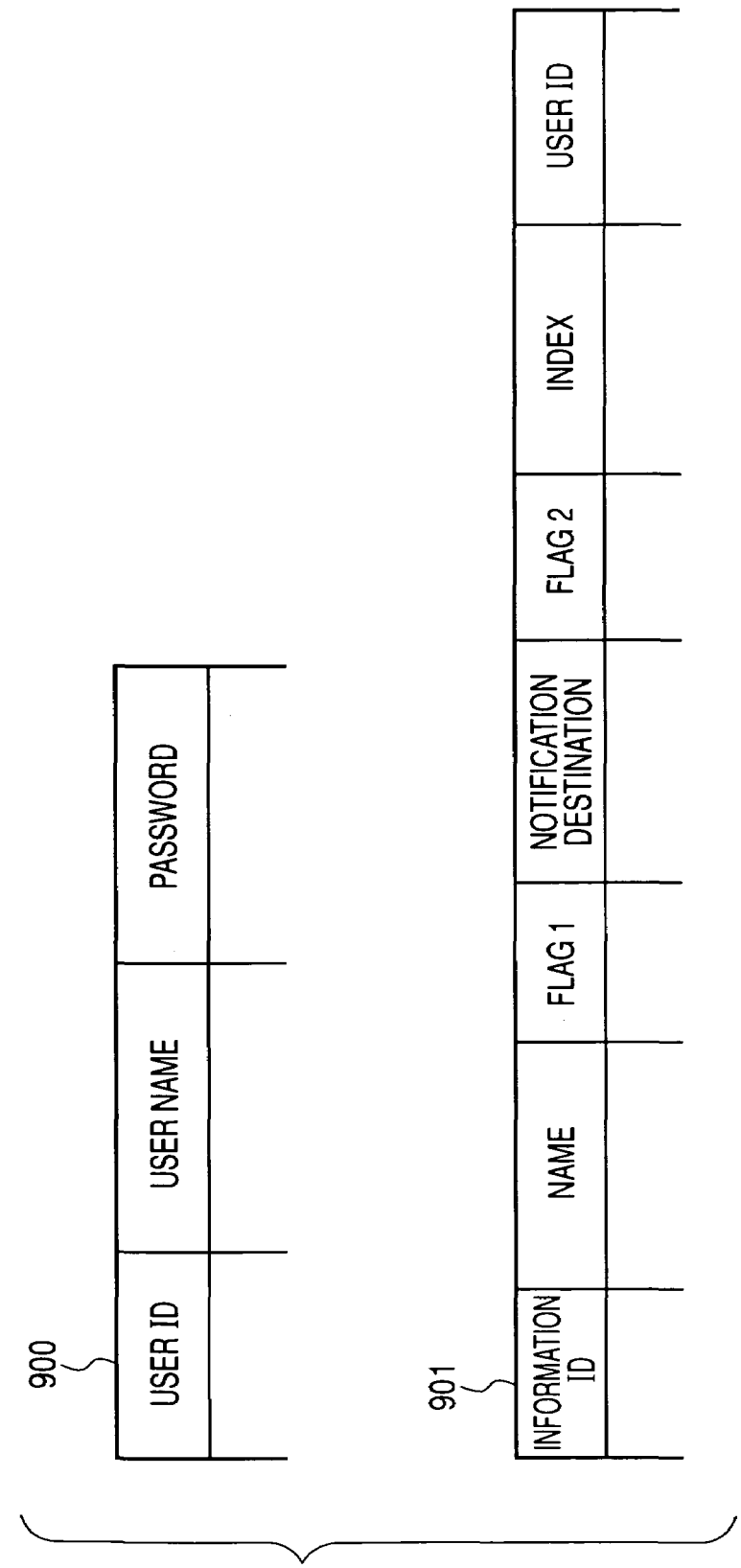

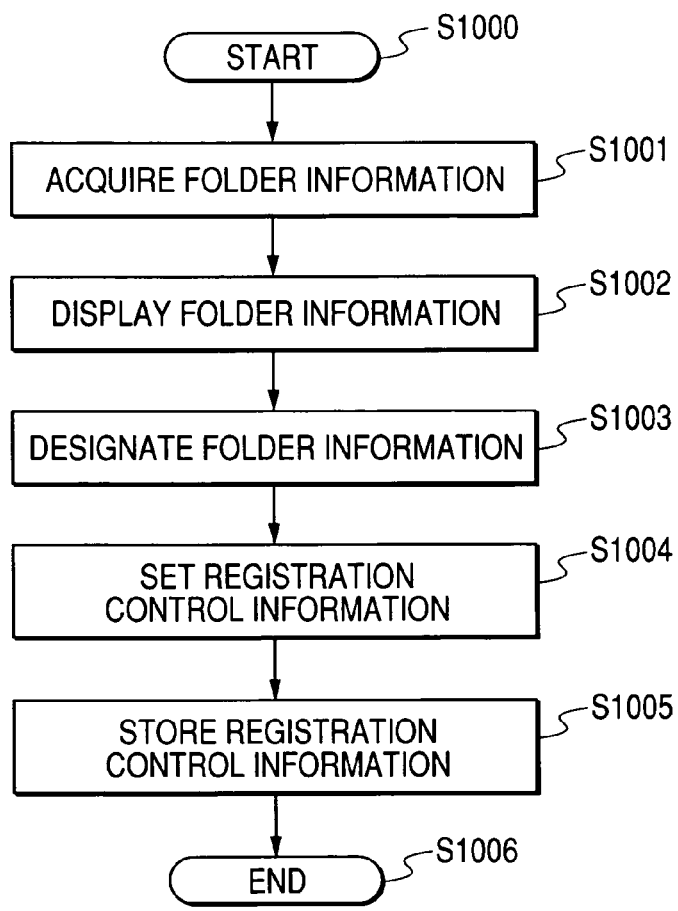

| FIG. 18A |
| FIG. 18B |

DOCUMENT MANAGEMENT SYSTEM HAVING DOCUMENT TRANSMISSION DEVICE, DOCUMENT MANAGEMENT SERVER, AND DOCUMENT MANAGEMENT CLIENT

BACKGROUND OF THE INVENTION

1. Field of the Invention

The present invention relates to a document management system, a control method which is applicable to the document management system, and a recording medium which stores a program to achieve the relevant control method. More particularly, the present invention relates a document management system in which a document transmission device of transmitting input image data, a document management server of associating as a document the received image data with a folder and storing them, and a document management client of, for example, browsing the image data of the document stored in the document management server are connected with others through a communication network, a control method which is adapted to the document management system, a recording medium which stores a program to achieve the relevant control method, and the program itself.

2. Related Background Art

Conventionally, a document management system in which a document management server and a document management client are connected to each other through a communication network is proposed. More specifically, the document management server is the server which functions to associate document management information such as an index and the like with image data of a document created by, for example, reading data of printed characters, figures, images and the like by a scanner or the like, and document data generated by a word processor or the like, and to store them, and the document management client is the client which functions to, for example, retrieve, display and print the stored information.

Moreover, as a document management system like this, for example, Japanese Patent Application Laid-Open No. 2003-085178 proposes a system to which a digital multifunctional device capable of reading an original, generating original image data and transmitting the generated image data is connected through the communication. In this system, the image data transmitted from the digital multifunctional device can be registered as a document in a document management server.

As shown in FIG. 16, the document management server of this type consists of, for example, a document management client 1600, a document management server 1601, an image transfer device 1606 and a digital multifunctional device 1607, and these devices are mutually connected through a communication network 1608. Further, the document management server 1601 consists of an attribute management server unit 1602, an attribute database file 1603, a volume server unit 1604 and a volume file 1605. The attribute management server unit 1602 is an RDBMS (relational database management system) which is adapted to manage or administrate an inclusive relation of a folder, a document and a page and their attributes so that image data and document data can be managed as documents stored in hierarchical folders. In this connection, the folder attribute, the document attribute, the page attribute and the like are stored in the attribute database file 1603. The volume server unit 1604 is a server which is adapted to manage real data associated with the page in the attribute management server unit 1602. In this connection, the image data, the document data and the like are stored in the volume file 1605.

The document management client 1600 which is a client in the document management system can, for example, retrieve, search and display the documents managed by the document management server 1601. In this case, the document management client 1600 transmits various requests to the attribute management server unit 1602, and receives relevant processed results from the attribute management server unit 1602, on the basis of an SQL (Structured Query Language) protocol defined on a TCP/IP (Transmission Control. Protocol/Internet Protocol). Moreover, when processes to the image data and the document data are executed, the document management client 1600 transmits various requests to the volume server unit 1604, and receives relevant processed results from the volume server unit 1604, on the basis of an RPC (Remote Procedure Call).

The digital multifunctional device 1607 acts as an image formation device having multiple functions such as a copy function, a scanner function, a printer function, a facsimile function, and the like, and the digital multifunctional device 1607 transmits image data read from a scanner and image data received through a facsimile to the image transfer device 1606 based on a communication network protocol such as an FTP (file transfer protocol). The image transfer device 1606 is adapted to register the image data received from the digital multifunctional device 1607 based on the communication network such as the FTP or the like in the document management server 1601 as the documents on the basis of registration control information such as preset storage destination folder, index and the like. Here, the information transfer control between the image transfer device 1606 and the document management server 1601 is substantially the same as that between the document management client 1600 and the document management server 1601. Incidentally, it should be noted that the registration control information is the information in which "size", "attribute information (e.g., XXX Co. Ltd.)", "index" and the like of the storage destination folder (that is, the folder of the destination at which the data should be stored) have been preset.

As just described, in the document management system according to the related background art, it is necessary not only to preset in the image transfer device 1606 the registration control information for the document management server 1601, but also to preset in the digital multifunctional device 1607 the transmission destination information such as a protocol used for file transmission, a transmission-destination host name, a folder path, a user name, a password and the like for the image transfer device 1606. For this reason, when the registration control information is newly created, or when the registration control information is changed due to a change of the folder structure of the document management server 1601, it is necessary to cerate and/or change not only the registration control information in the image transfer device 1606 but also the transmission destination information in the digital multifunctional device 1607, whereby a problem that operations for creating and changing the registration control information become complicated occurs.

Moreover, in a case where a document is registered, the target which is displayed on the digital multifunctional device 1607 and thus able to be designated by a user is the transmission destination information associated with the registration control information in the image transfer device 1606, whereby it is impossible to individually confirm and designate the content of the registration control information. Furthermore, the transmission destination information in the digital multifunctional device 1607 is created as the information to be shared by all the users of the digital multifunctional device 1607, whereby it is difficult to designate desired registration control information with respect to each user in the document management server 1601 or with respect to each document registration. For this reason, a problem that it is impossible from the digital multifunctional device 1607 to flexibly designate the registration control information through a simple operation occurs.

Incidentally, as another conventional document management system, for example, Japanese Patent Application Laid-Open No. 2001-358857 proposes a system in which, when a document scanned by a digital multifunctional device is registered as a file, date and time of the scanning is automatically set as a file name at the time of the registration.

In this connection, when only the date and time is indicated as the file name of the stored document, it is very difficult for a user to understand and grasp the content of the relevant document when referring to it, whereby there is a possibility that the user hits on addition of a character string indicating a relevant theme (e.g., "regular report_2003505.pdf" etc.) to the document name. However, even in such a case, the user has to manually change the file name in the document management system, whereby time and trouble become necessary and use of the system becomes inefficient. Moreover, in a case where a fixed character string is designated as the document name with respect to each address (i.e., destination) by using a document registration application, all the documents in the folder of the certain storage destination have the document names "identical (same) character string+date and time". It cannot absolutely be said that the document name of this type is comprehensible. Furthermore, in a case where a document name is designated on the digital multifunctional device, although an arbitrary document name can be created, it is necessary for the user to input necessary characters and number symbols on a keyboard screen on an operation panel of the digital multifunctional device, whereby time and trouble become necessary due to its operationality (troublesome working).

SUMMARY OF THE INVENTION

An object of the present invention is to provide a document management system which eliminates the conventional problems as described above.

Under the above object, one feature of the present invention is to provide a document management system which can easily create, generate and change registration control information.

Another feature of the present invention is to provide a document management system which can flexibly designate registration control information through a simple operation.

Still another feature of the present invention is to provide a document management system which can easily designate a document name.

Other objects and features of the present invention will become apparent from the following description in conjunction with the accompanying drawings.

BRIEF DESCRIPTION OF THE DRAWINGS

FIG. 1 is a block diagram showing the overall structure of a document management system according to the first embodiment of the present invention;

FIG. 3 is a view showing an example of defining tables in an attribute storage unit of the document management server according to the first embodiment of the present invention;

FIG. 9 is a view showing an example of defining tables in the attribute storage unit in order that the document management server in the system according to the first embodiment of the present invention manages document registration control information associated with the user;

FIG. 10 is a flow chart for explaining a process of creating registration control information associated with a folder to be executed in the document management client in the system according to the first embodiment of the present invention;

FIG. 11 is a view showing an example of defining a table in the attribute storage unit in order that the document management server in the system according to the first embodiment of the present invention manages document registration control information associated with the folder;

DETAILED DESCRIPTION OF THE PREFERRED EMBODIMENTS

First Embodiment

Figure 2B:
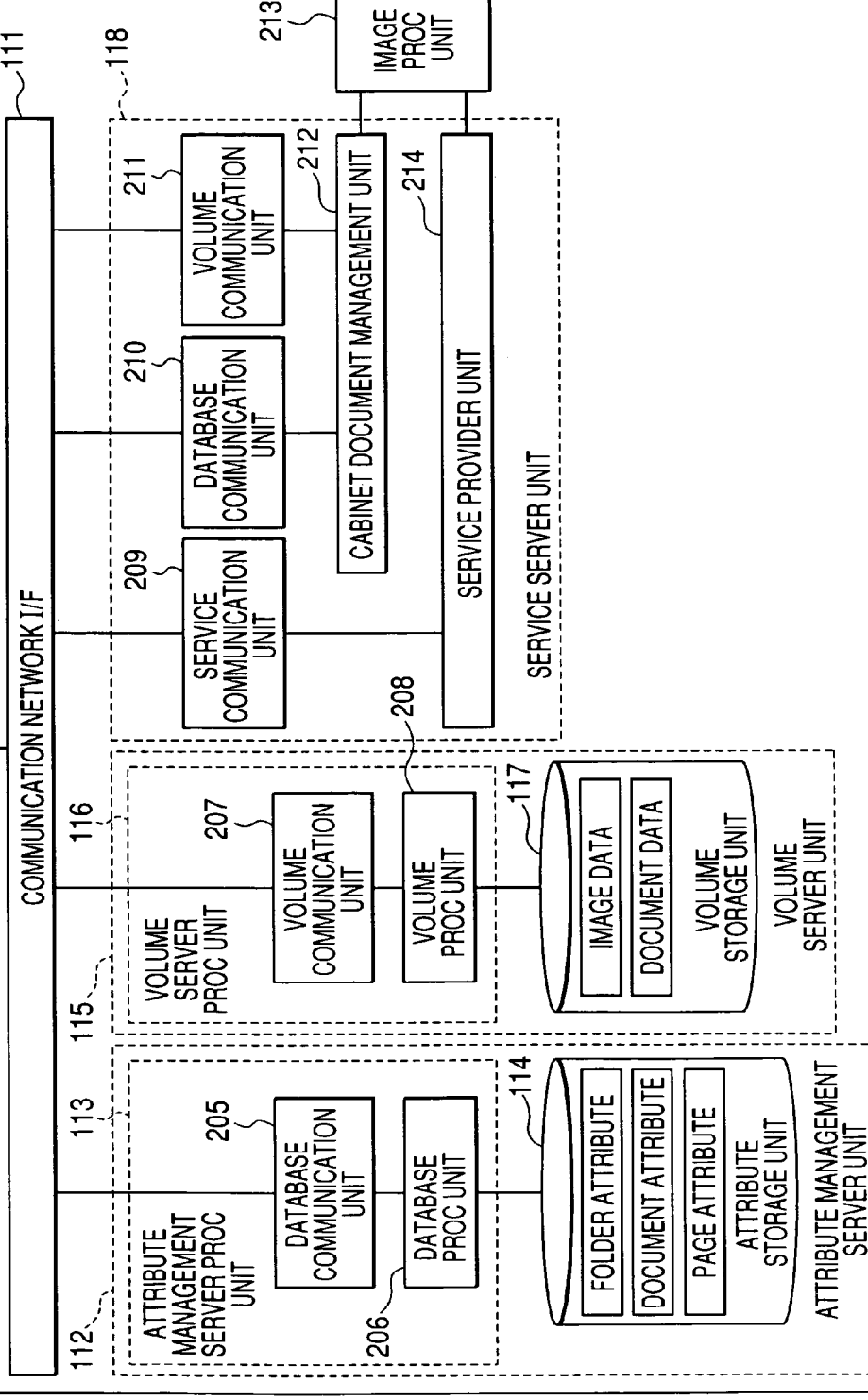
FIG. 2 is comprised of FIGS. 2A and 2B is a block diagram showing the functional structure of a document management client and a document management server in the system according to the first embodiment of the present invention.

Hereinafter, the first embodiment of the present invention will be explained in detail with reference to the attached drawings. It should be noted that the portion having the same function as that in the respective drawings is denoted by the same reference numeral and redundant explanation thereof will be omitted.

FIG. 1 is a block diagram for explaining the overall structure of a document management system in the first embodiment of the present invention. In the present embodiment, the document management system consists of a document management client 100, a document management server 110 and a digital multifunctional device 130, which are connected with each other through a communication network 140. It should be noted that plural document management clients and plural digital multifunctional devices can be respectively connected to the network.

The document management client 100 is a client of the present document management system in the present embodiment, which searches and displays the document managed by the document management server 110, and consists of a UI (user interface) unit 101, a client processing unit 102 and a communication network I/F (interface) 103. The UI unit 101, which receives an indication (or an instruction) from a user concerned with execution of various functions of the document management client 100 such as registration of the document, search for the document, display of the document, and the like and supplies various information such as the processed result and the like to the user, consists of a display device represented by a CRT (cathode ray tube), a liquid crystal display or the like and an input device such as a keyboard or a pointing device. The client processing unit 102, which consists of a CPU (central processing unit), a memory and the like, executes processes of the respective functions of the document management client 100 such as registration of the document, search for the document, display of the document and the like, and transmits various request commands to the document management server 110 through the communication network I/F 103 in case of executing processes for the document management server 110, then receives responses for the request commands.

The document management server 110, which is a server of the document management system in the present embodiment for the purpose of managing image data and document data which is received from various devices such as the document management client 100, the digital multifunctional device 130 and the like and is stored, consists of a communication network I/F 111, an attribute management server unit 112, a volume server unit 115 and a service server unit 118. The document management server 110 stores the image data received from the digital multifunctional device 130 as the document associating with a folder and also stores user information to manage that information. Registration control information every user is managed according to the user information, and registration control information every folder is managed. It should be noted that the folder is used for hierarchically managing the document data by a directory format when the document data is stored as a file, and is used in the known computer system.

The attribute management server unit 112, the volume server unit 115 and the service server unit 118 may be respectively constituted by the one personal computer as in the first embodiment or may be respectively constituted by the separated plural computers to be connected through the communication network 140. The communication network I/F 111, which is connected with the communication network 140, executes a process of a communication network protocol such as a TCP/IP.

The attribute server unit 112, which is a server unit used for managing an inclusive relation of the folder, the document and the page and the attributes thereof such that the image data and the document data can be managed as the document stored in the hierarchical folder, consists of an attribute management server processing unit 113 and an attribute storage unit 114. The attribute management server processing unit 113, which is organized by one task, receives a request command from the client processing unit 102 or the service server unit 118 through the communication network I/F 111 and executes a process such as the update, the search or the like to the attribute storage unit 114 and then transmits the processed result to the client processing unit 102 or the service server unit 118. The attribute storage unit 114, which stores the folder attribute, the document attribute, the page attribute, user information, the registration control information managed every user by the user information, the registration control information managed every folder, and the like, is generally a hard disk or the like.

The volume server unit 115, which is a server unit used for accumulating and managing actual data such as the document data, the image data or the like corresponded to the page in the attribute management server processing unit 113, consists of a volume server processing unit 116 and a volume storage unit 117. The volume server processing unit 116, which is organized by one task, receives a request command from the client processing unit 102 or the service server unit 118 through the communication network I/F 111 and executes a process such as the update, the data acquisition or the like to the volume storage unit 117 and then transmits the processed result to the client processing unit 102 or the service server unit 118. The volume storage unit 117, which stores the document data and the image data, is generally a hard disk or the like.

The service server unit 118, which is organized by one task, receives a request command from the digital multifunctional device 130 through the communication network I/F 111 and executes each process requested from the digital multifunctional device 130, and when processes for the attribute management server unit 112 or the volume server unit 115 such as the registration of document, the update of attribute, the search and the like are executed, transmits the various request commands to the above unit 112 or 115 through the communication network I/F 111 and receives the responses for the request commands and then transmits the processed result thereof to the digital multifunctional device 130.

The digital multifunctional device 130 which acts as an image formation device having multiple functions such as a copy function, a scanner function, a printer function, a facsimile function, a network transmission/reception function and the like consists of a scanner unit 131 being an image input device, a printer unit 132 being an image output device, a controller unit 133, and an operation unit 134 being a user interface. The scanner unit 131, the printer unit 132 and the operation unit 134 are respectively connected to the controller unit 133, which is connected to a communication network (LAN (local area network)) 140 and a public line (WAN (wide area network)) 150.

The controller unit 133 executes a process such as a scan job or the like on the basis of input information from the operation unit 134 and supplies information such as the device status, the job status or the like to the operation unit 134. Further, when a process for the document management server 110 is produced, the controller unit 133 transmits a request command to the service server unit 118 and receives the response for the request command and then supplies information acquired from the document management server 110 to the operation unit 134.

FIGS. 2A and 2B are block diagrams showing the functional structure of the document management client and the document management server shown in FIG. 1, and the portion having the same function as that in FIG. 1 is denoted by the same reference numeral.

The client processing unit 102 of the document management client 100 consists of a client application unit 200, an image processing unit 201, a cabinet document management unit 202, a database communication unit 203 and a volume communication unit 204. The client application unit 200 executes processes of the respective functions of the document management client 100 in accordance with an indication from the UI unit 101 and executes a control of a display screen of the UI unit 101. Further, when processes for the attribute management server unit 112 and the volume server unit 115 are executed, the client application unit 200 supplies the requests for the processes to the cabinet document management unit 202 and receives the processed result thereof from the cabinet document management unit 202. The image processing unit 201 executes image processes such as expansion of image data, compression of image data, color space conversion, elimination of background noise, enlargement/reduction of image size, image rotation and the like in accordance with the requests from the client application unit 200 and the cabinet document management unit 202.

The cabinet document management unit 202 can deal with the requests for the attribute management server unit 112 and the volume server unit 115 with an object model organized by cabinet, folder, document and page. Then, when processes such as reference, update and the like for the folder attribute, the document attribute and the page attribute are executed, the cabinet document management unit 202 supplies the requests for the processes to the database communication unit 203 and receives the processed result from the database communication unit 203, and when processes such as registration, deletion, acquisition and the like for the image data and the document data are executed, the cabinet document management unit 202 supplies the requests for the processes to the volume communication unit 204 and receives the processed result from the volume communication unit 204. The database communication unit 203 transmits a request command for the attribute management server unit 112 to a database communication unit 205 through the communication network I/F 103 according to an SQL (Structured Query Language) protocol defined on the TCP/IP and receives a response command for the request from the database communication unit 205. The volume communication unit 204 transmits a request command for the volume server unit 115 to a volume communication unit 207 through the communication network I/F 103 according to a RPC (Remote Procedure Call) and receives a response command for the request from the volume communication unit 207.

The attribute management server processing unit 113 of the document management server 110 consists of the database communication unit 205 and a database processing unit 206. When a request command for the attribute management server unit 112 is received from the database communication unit 203 or a database communication unit 210 through the communication network I/F 111 according to the SQL protocol defined on the TCP/IP, the database communication unit 205 supplies the request to the database processing unit 206 and transmits the processed result of the request to the database communication unit 203 or the database communication unit 210 as a response command. The database processing unit 206, which is an RDBMS (Relation Database Management System) used for managing the inclusive relation of the folder, the document and the page and the attributes thereof, executes processes such as the update or the search to the attribute storage unit 114 being a database file.

FIG. 3 is a view showing an example of defining tables in the attribute storage unit 114 in order that the database processing unit 206 manages the inclusive relation of the folder, the document and the page in the document and the attributes thereof. A folder management table 300 is organized by a folder ID used for discriminating the folder, a parent folder ID used for discriminating a parent folder, a folder name and the creation date and time. A document management table 301 is organized by a document ID used for discriminating the document, the parent folder ID used for discriminating the parent folder, a document name, size of the document, the number of pages, a document type used for discriminating if the document is an image document being the sets of image data or discriminating if the document is included in document data of what kind of the application, the creation date and time and a keyword included in an index used for searching the document. A page management table 302 is organized by a page ID used for discriminating the page, a parent document ID used for discriminating the parent document, a page number, a page type used for discriminating a file format of page data, paper size used for discriminating the size of a paper in case of image data, file size, image data managed by the volume server unit 115 and a volume ID used for discriminating document data.

Next, referring to FIGS. 2A and 2B again, the volume server processing unit 116 of the document management server 110 consists of the volume communication unit 207 and a volume processing unit 208. When a request command for the volume server unit 115 is received from the volume communication unit 204 or a volume communication unit 211 through the communication network I/F 111 according to the RPC, the volume communication unit 207 supplies the request to the volume processing unit 208 and transmits the processed result for the request to the volume communication unit 204 or the volume communication unit 211 as a response command. The volume processing unit 208 executes processes such as the update, the data acquisition and the like to the volume storage unit 117 being a volume file.

Figure 4:
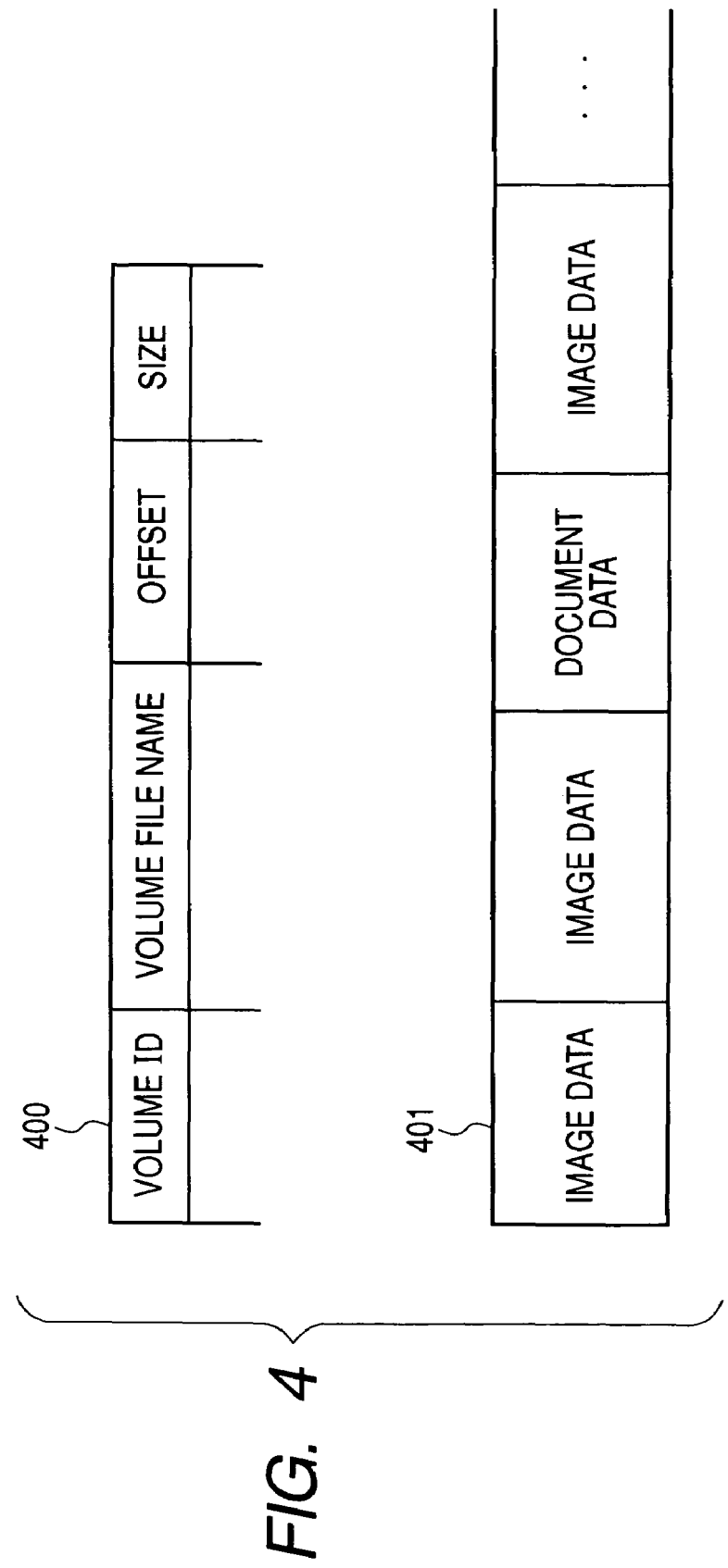
FIG. 4 is a view showing an example of the data structure in a volume storage unit of the document management server according to the first embodiment of the present invention.

FIG. 4 is a view showing an example of the data structure in the volume storage unit 117 in order that the volume processing unit 208 adds or acquires the image data and the document data. A volume management file 400 is organized by a volume ID used for discriminating data, a file name used for discriminating a volume storage file in which the data is stored, an offset being a position of starting to store the data, and data size. Actual image data and actual document data are sequentially stored in a volume storage file 401.

The service server unit 118 of the document management server 110 consists of a service communication unit 209, the database communication unit 210, the volume communication unit 211, a cabinet document management unit 212, an image processing unit 213 and a service provider unit 214.

When a request command for the document management server 110 is received from the multifunctional device 130 through the communication network I/F 111 according to an SOAP (Simple Object Access Protocol) on an HTTP (Hyper Text Transport Protocol), the service communication unit 209 supplies the request to the service provider unit 214 and transmits the processed result for the request to the digital multifunctional device 130 as a response command. The service provider unit 214 executes a process in accordance with a request from the service communication unit 209 and sends back the processed result. Then, when processes such as the registration of document, the update of attribute, the search and the like for the attribute management server unit 112 and the volume server unit 115 are executed, the service provider unit 214 supplies the requests for the processes to the cabinet document management unit 212 and receives the processed result for the requests from the cabinet document management unit 212. Because the respective functional structure units of the database communication unit 210, the volume communication unit 211, the cabinet document management unit 212 and the image processing unit 213 are the same as those in the above document management client, the explanations thereof will be omitted.

Figure 5:
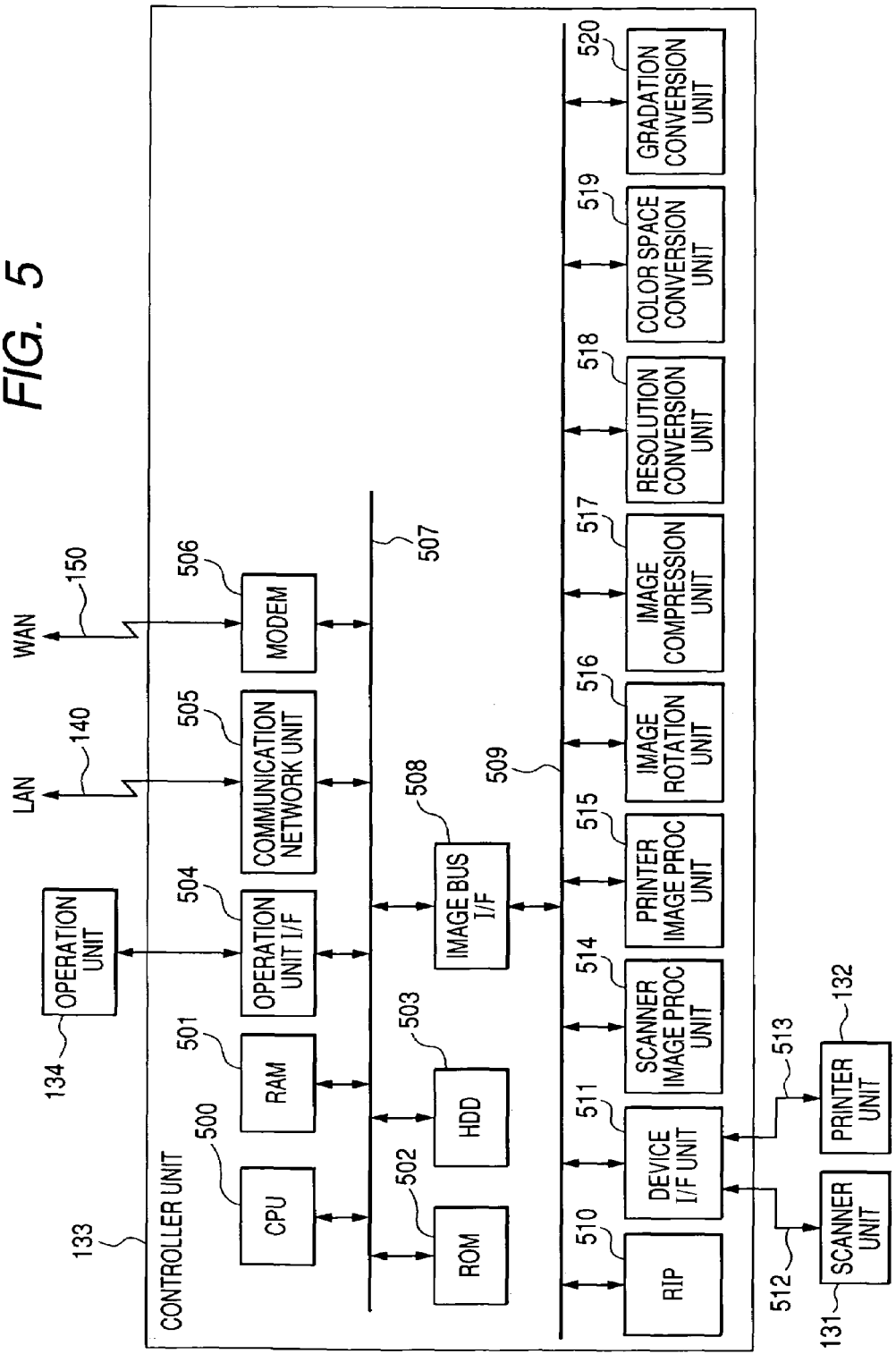
FIG. 5 is a block diagram showing the structure of a digital multifunctional device in the system according to the first embodiment of the present invention.

FIG. 5 is a block diagram showing the structure of the digital multifunctional device shown in FIG. 1, and the same portion as that in FIG. 1 is denoted by the same reference numeral. The controller unit 133, which is connected to the scanner unit 131 being an image input device or the printer unit 132 being an image output device, acts as a controller used for inputting and outputting image information or device information by connecting with the communication network (LAN) 140 or the public line (WAN) 150.

In the controller unit 133, reference numeral 500 shown in FIG. 5 denotes a CPU which acts as a controller for controlling an overall system. Reference numeral 501 denotes a RAM (random access memory) which acts as a system work memory in order to operate the CPU 500 and also acts as an image memory (buffer memory) for temporarily storing image data which was input. Reference numeral 502 denotes a ROM (read only memory) which acts as a boot ROM, in which a boot program of the system is stored. Reference numeral 503 denotes a hard disk drive (HDD) which stores the system software and image data.

Reference numeral 504 denotes an operation unit I/F, which is an interface unit operating with the operation unit 134 and outputs image data to be displayed on the operation unit 134 to the operation unit 134. Further, the operation unit I/F 504 acts to notify information input by a user from the operation unit 134 to the CPU 500. Reference numeral 505 denotes a communication network unit (Network), which is connected to the communication network (LAN) 140 and executes the input/output of information. Reference numeral 506 denotes a MODEM, which is connected to the public line (WAN) 150 and executes the input/output of image information. The above devices are disposed on a system bus 507.

Reference numeral 508 denotes an image bus I/F, which serves to connect the system bus 507 with an image bus 509 for transferring the image data at a high speed and is a bus bridge used for converting the data structure. The image bus 509 is constituted by a PCI (peripheral component interconnect) bus or an IEEE (Institute of Electrical and Electronics Engineers) 1394. On the image bus 509, the following devices are disposed.

Reference numeral 510 denotes a raster image processor (RIP), which extracts a PDL (page description language) code into a bitmap image data. Reference numeral 511 denotes a device I/F unit, which serves to connect the scanner unit 131 and the printer unit 132 being the image input and output devices with the controller 133 through an image input unit interface 512 and a print unit interface 513 and executes conversion to be executed between a synchronous system and an asynchronous system of image data. Reference numeral 514 denotes a scanner image processing unit, which executes processes such as correction, processing and editing to the input image data. Further, the scanner image processing unit 514 has functions of judging whether or not an input image is a color original image or a black/white original image from a saturation signal of the image and holding the judgment result. Reference numeral 515 denotes a printer image processing unit, which executes processes such as correction, processing and editing to the output image data.

Reference numeral 516 denotes an image rotation unit, which reads image data sent from the scanner unit 131 and simultaneously rotates the image to store data of that rotated image in a memory cooperating with the scanner image processing unit 514 or rotates an image of which data is stored in the memory to store data of that rotated image in the memory or can execute the pint output of the image of which data is stored in the memory while rotating the image cooperating with the printer image processing unit 515. Reference numeral 517 denotes an image compression unit, which executes an image data compression/expansion process to multi-level image data by a method of JPEG (Joint Photographic Experts Group), and to binary image data by methods of JBIG (Joint Bi-level Experts Group), MMR (Modified Modified READ code) and MH (Modified Huffman). Reference numeral 518 denotes a resolution conversion unit, which executes a resolution conversion process to image data in the memory and stores the converted image data in the memory. Reference numeral 519 denotes a color space conversion unit, which converts, for example, YUV image data in the memory into Lab image data by using a matrix operation and stores the converted image data in the memory. Reference numeral 520 denotes a gradation conversion unit, which converts, for example, eight-bit/256-gradation image data in the memory into one-bit/two-gradation image data by a method of error diffusion process and stores the converted image data in the memory. The image rotation unit 516, the image compression unit 517, the resolution conversion unit 518, the color space conversion unit 519 and the gradation conversion unit 520 can respectively operate linking with each other. For example, in a case where the image rotation and the resolution conversion are executed to an image of which data is stored in the memory, both the processes can be executed without passing through the memory.

Figure 6:
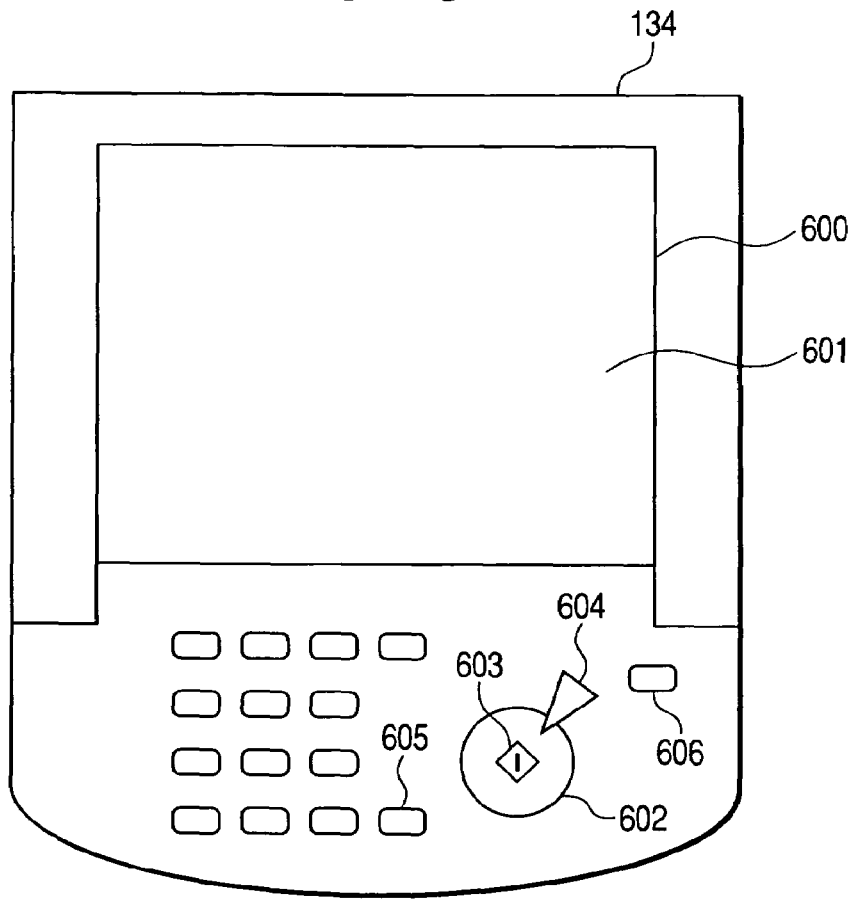
FIG. 6 is a view showing the structure of an operation unit of the digital multifunctional device according to the first embodiment of the present invention.

FIG. 6 shows the structure of the operation unit 134. A touch panel sheet 601 is adhered on a LCD (liquid crystal display) unit 600, which displays an operation screen of the system and software keys, and when a displayed key is depressed, notifies related position information to the CPU 500 in the controller unit 133. A start key 602 is used in such a case when a reading operation of an original image is started. A two-color (green and red) LED (light emitting diode) 603 positioned on the center of the start key 602 indicates whether or not the start key 602 is in a usable state by color of the LED. A stop key 604 acts to stop a functioning operation. An ID (identification) key 605 is used when a user ID of the user is input. A reset key 606 is used when the setting set from the operation unit is initialized.

Figure 7:
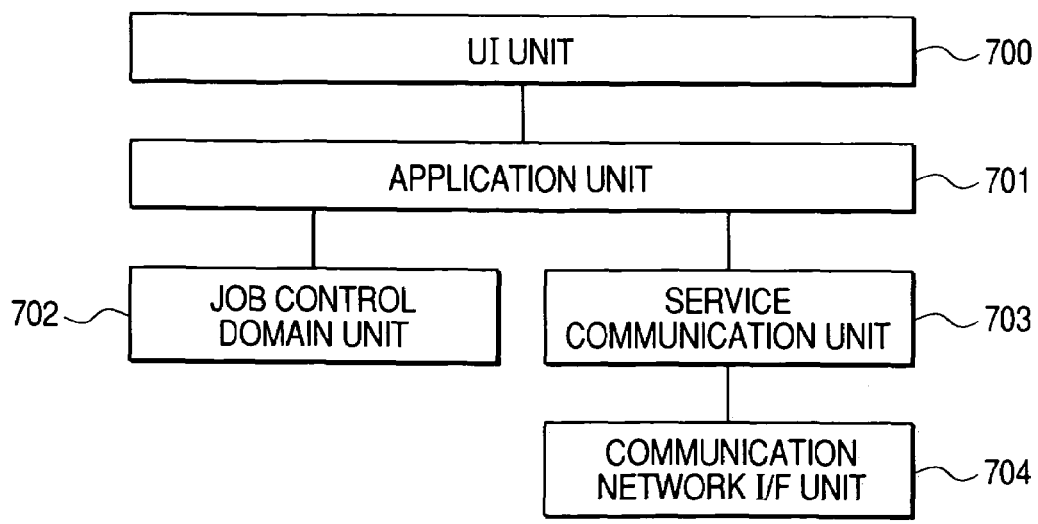
FIG. 7 is a block diagram showing the functional structure of system software of the digital multifunctional device according to the first embodiment of the present invention.

FIG. 7 is a block diagram showing the functional structure of the system software in the controller unit of the digital multifunctional device shown in FIG. 1. A UI (user interface) unit 700 supplies input information input from the user to an application unit 701 and receives the processed result for the input information from the application unit 701 and then creates a screen to be displayed on the operation unit 134. The application unit 701 executes a process in accordance with a request sent from the UI unit 700 and enters a scan job to a job control domain unit 702 together with the designated scan setting when a scan process is requested and then receives information such as device status, job status or the like from the job control domain unit 702. Then, when an access to the document management server 110 is requested, the application unit 701 supplies the request to a service communication unit 703 and then receives the processed result for the request. The job control domain unit 702 controls processes of plural jobs such as a scan job, a copy job, a print job, a facsimile job and the like and causes the scanner unit 131 to operate on the basis of the designated scan setting when the scan job is entered, then reads an original, generates image data and stores the generated image data. The service communication unit 703 transmits a request for the document management server 110 to the service communication unit 209 in the document management server 110 through a communication network I/F 704 according to the SOAP on the HTTP and receives the response for the request. The communication network I/F 704, which is connected with the communication network 140, executes a process of the communication network protocol such as the TCP/IP or the like.

Figure 8:
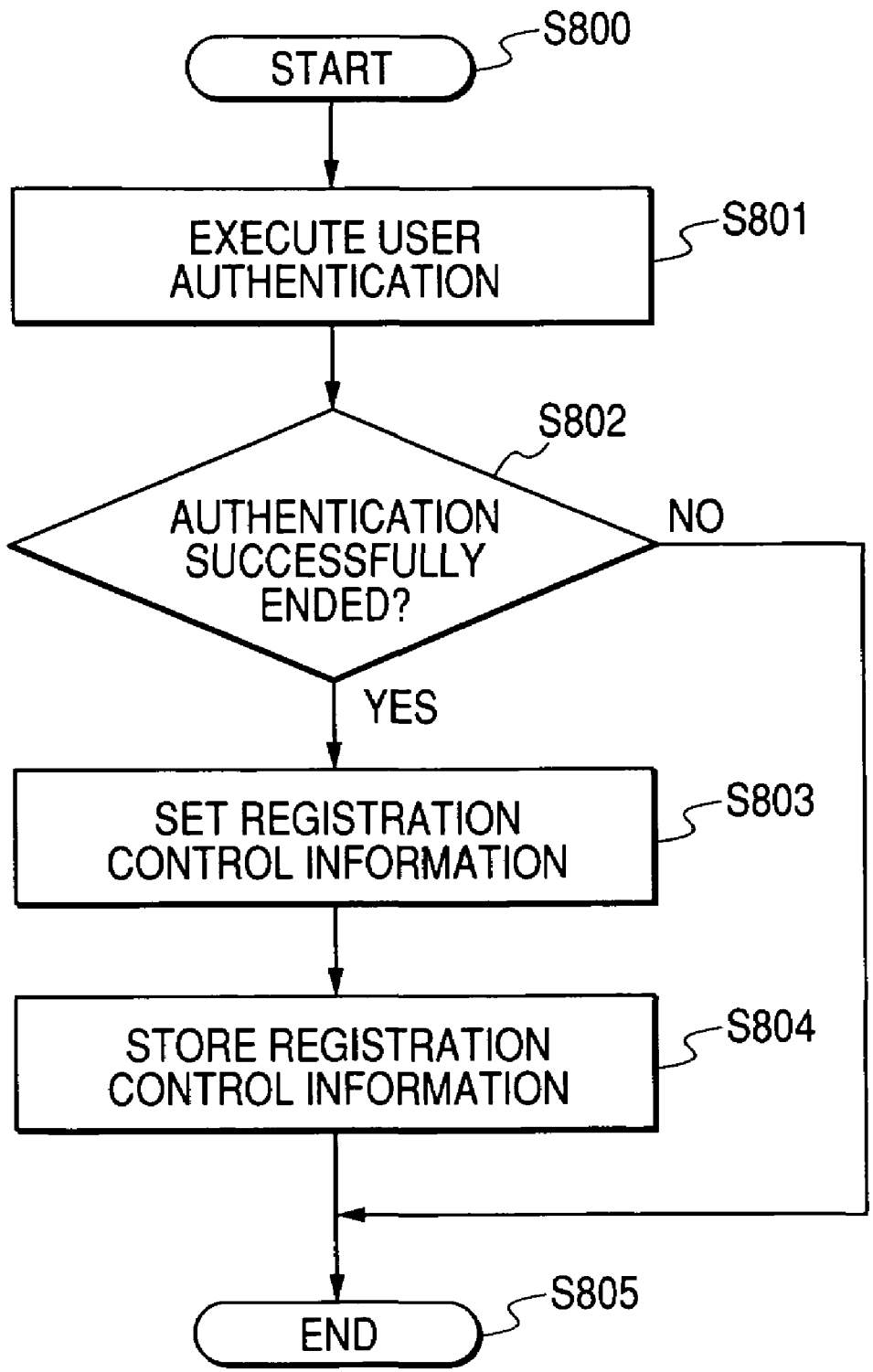
FIG. 8 is a flow chart for explaining a process of creating registration control information associated with a user to be executed in the document management client in the system according to the first embodiment of the present invention.

Next, an operation of a process of creating registration control information associated with the user to be executed in the document management client will be explained with reference to a flow chart shown in FIG. 8. Initially, a process is started by an indication or the like of the user (step S800), and user authentication is executed to the document management server on the basis of a user name and a password input by the user and then the authentication result is received (step S801). Next, it is judged whether or not the user authentication is successfully ended (step S802). When judged that the user authentication is successfully ended, desired registration control information such as a notification destination, index or the like is set (step S803). It should be noted that plural registration control information can be set. The registration control information is stored in the attribute storage unit 114 in the document management server associating with the user (step S804), and then the process ends (step S805). In the step S802, when the user authentication is not successfully ended, the process ends (step S805) without executing any process.

FIG. 9 is a view showing an example of defining tables in the attribute storage unit 114 in order that the document management server manages the document registration control information associated with the user. A user management table 900 manages user information organized by a user ID used for discriminating the user, a user name and a password. A registration control information table 901 is organized by an information ID used for discriminating the registration control information, a title used for discriminating the registration control information, a flag 1 used for discriminating whether or not a notification destination is set, a mail address of the notification destination, a flag 2 used for discriminating whether or not an index is set, a character row of the index and a user ID of the user, with whom the registration control information associates.

Next, an operation of a process of creating registration control information associated with the folder to be executed in the document management client will be explained with reference to a flow chart shown in FIG. 10. Initially, a process is started by an indication or the like of the user (step S1000), and a list of folder information is acquired from the document management server (step S1001) and then the list of folder is displayed (step S1002). Next, a desired folder is designated (step S1003), and further, desired registration control information such as a notification destination, an index or the like is set (step S1004). It should be noted that plural registration control information can be set. Then, the registration control information is stored in the attribute storage unit 114 of the document management server associating with the folder (step S1005), and then the process ends (step S1006).

FIG. 11 is a view showing an example of defining a table in the attribute storage unit 114 in order that the document management server manages the document registration control information associated with the folder. A registration control information table 1100 is organized by the information ID used for discriminating the registration control information, the title used for discriminating the registration control information, the flag 1 used for discriminating whether or not the notification destination is set, the mail address of the notification destination, the flag 2 used for discriminating whether or not the index is set, the character row of the index and a folder ID of a folder with which the registration control information associates.

Figure 12:
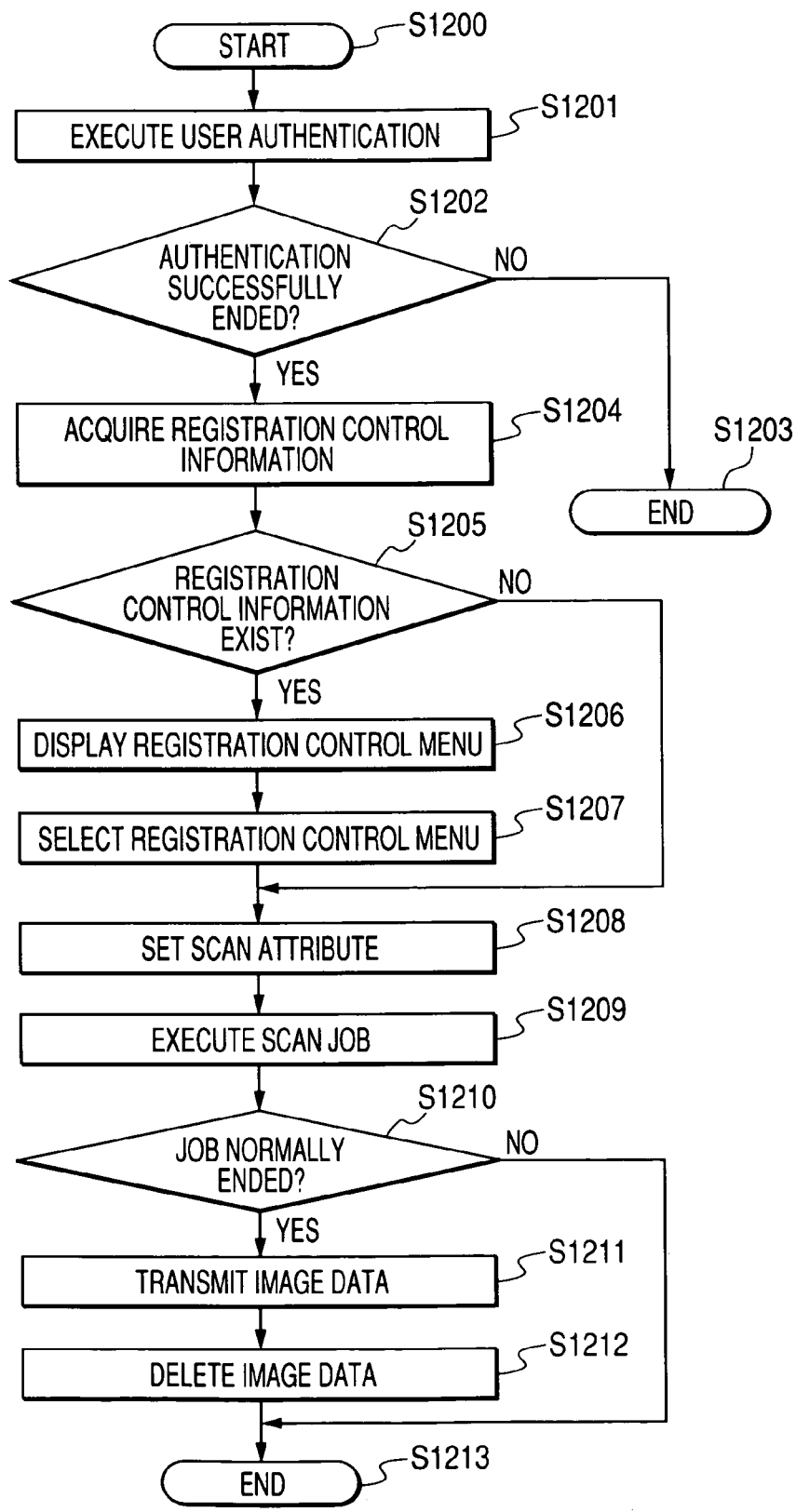
FIG. 12 is a flow chart for explaining an image transmission process using the registration control information associated with the user to be executed in the digital multifunctional device in the system according to the first embodiment of the present invention.

Next, an operation of an image data transmission process using the registration control information associated with the user to be executed in the digital multifunctional device will be explained with reference to a flow chart shown in FIG. 12. Initially, a process is started by an indication or the like of the user (step S1200), and the user authentication is executed to the document management server on the basis of a user name and a password input by the user and then the authentication result is received (step S1201). Next, it is judged whether or not the user authentication is successfully ended (step S1202). When the user authentication is not successfully ended, the process ends (step S1203) without executing any process. Meanwhile, when the user authentication is successfully ended in the step S1202, the registration control information associated with the user is acquired from the document management server (step S1204), and it is judged whether or not the registration control information exists (step S1205). When the registration control information exists, a list of that information is displayed (step S1206), and desired registration control information is designated (step S1207). In the step S1205, when the registration control information does not exist, processes to be executed in the steps S1206 and S1207 are not executed and the flow advances to a step S1208.

Subsequently, a desired scan setting such as original size, resolution or the like is set (step S1208), and a scan job is started by depressing a start button in the operation unit, then an original is read, image data is generated and the image data is stored (step S1209). Next, it is judged whether or not the scan job is normally ended (step S1210). When the scan job is normally ended, a document registration command is transmitted to the document management server (step S1211) on the basis of the registration control information designated in the step S1207 and the image data stored by the process in the step S1209, and the image data stored by the process in the step S1209 is deleted (step S1212), and then the process ends (step S1213). In the step S1210, when the scan job is not normally ended, processes to be executed in the steps S1211 and S1212 are not executed, and the process ends.

Figure 13:
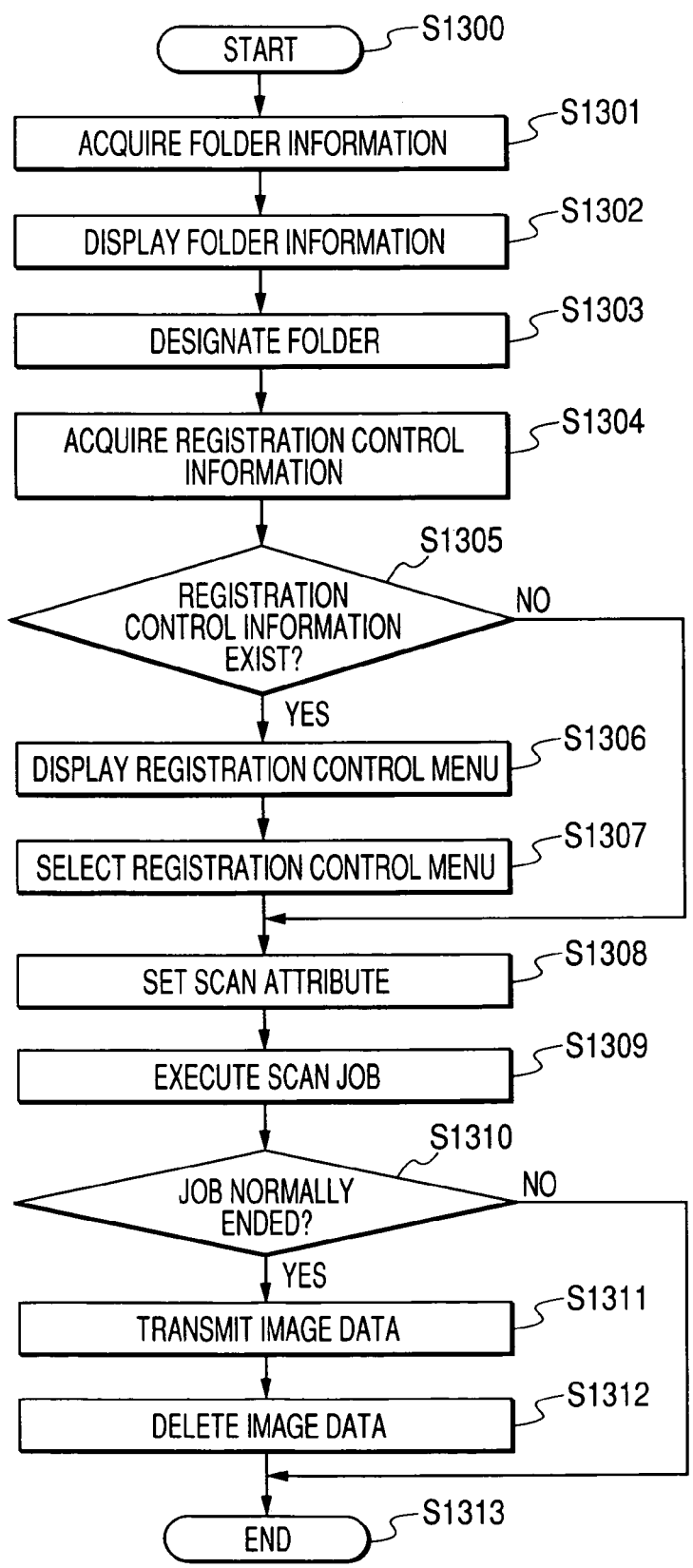
FIG. 13 is a flow chart for explaining an image transmission process using the registration control information associated with the folder to be executed in the digital multifunctional device in the system according to the first embodiment of the present invention.

Next, an operation of an image data transmission process using the registration control information associated with the folder to be executed in the digital multifunctional device will be explained with reference to a flow chart shown in FIG. 13. Initially, a process is started by an indication or the like of the user (step S1300), and a list of folder information is acquired from the document management server (step S1301) and then the list of folder is displayed (step S1302). Next, a desired folder is designated (step S1303), and the registration control information associated with that folder is acquired from the document management server (step S1304). Because the processes from steps S1305 to S1313 are the same as those from the steps S1205 to S1213 shown in FIG. 12, the explanation thereof will be omitted.

Figure 14:
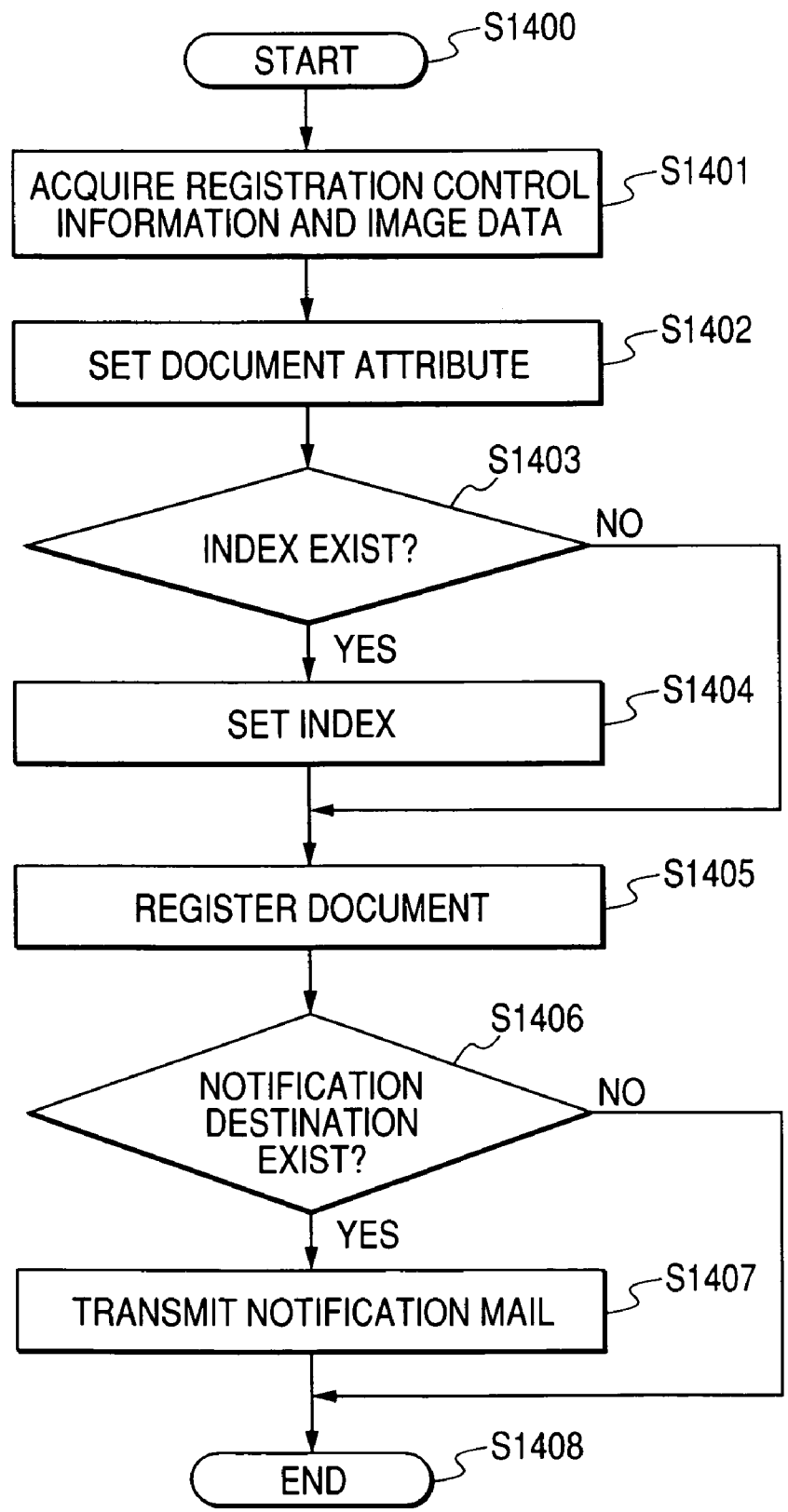
FIG. 14 is a flow chart for explaining a document registration process to be executed in the document management server in the system according to the first embodiment of the present invention.

Next, an operation of a document registration process to be executed in the document management server will be explained with reference to a flow chart shown in FIG. 14. Initially, a process is started upon receiving a document registration request command from the digital multifunctional device (step S1400), and the registration control information and the image data are read out of that command (step S1401). Next, a document title, the creation date and time and the like are set in a document attribute buffer of DocProperty secured on the memory (step S1402), and it is discriminated whether or not the index is set in the registration control information acquired in the step S1401 (step S1403). When the index is set in the registration control information, the character row of the index is set in the document attribute buffer of DocProperty (step S1404) and then a registration process of the document based on the document attribute buffer of DocProperty is executed (step S1405). In the step S1403, when the index is not set in the registration control information, the process to be executed in the step S1404 is not executed, and the flow advances to the step S1405. Next, it is discriminated whether or not a notification destination is set in the registration control information acquired in the step S1401 (step S1406). When the notification destination is set in the registration control information, a mail of the document registration notification (i.e., a notification mail) is transmitted to a mail address of that destination (step S1407), and the process ends (step S1408). In the step S1406, when the notification destination is not set in the registration control information, the process to be executed in the step S1407 is not executed, and the process ends (step S1408).

Figure 15:
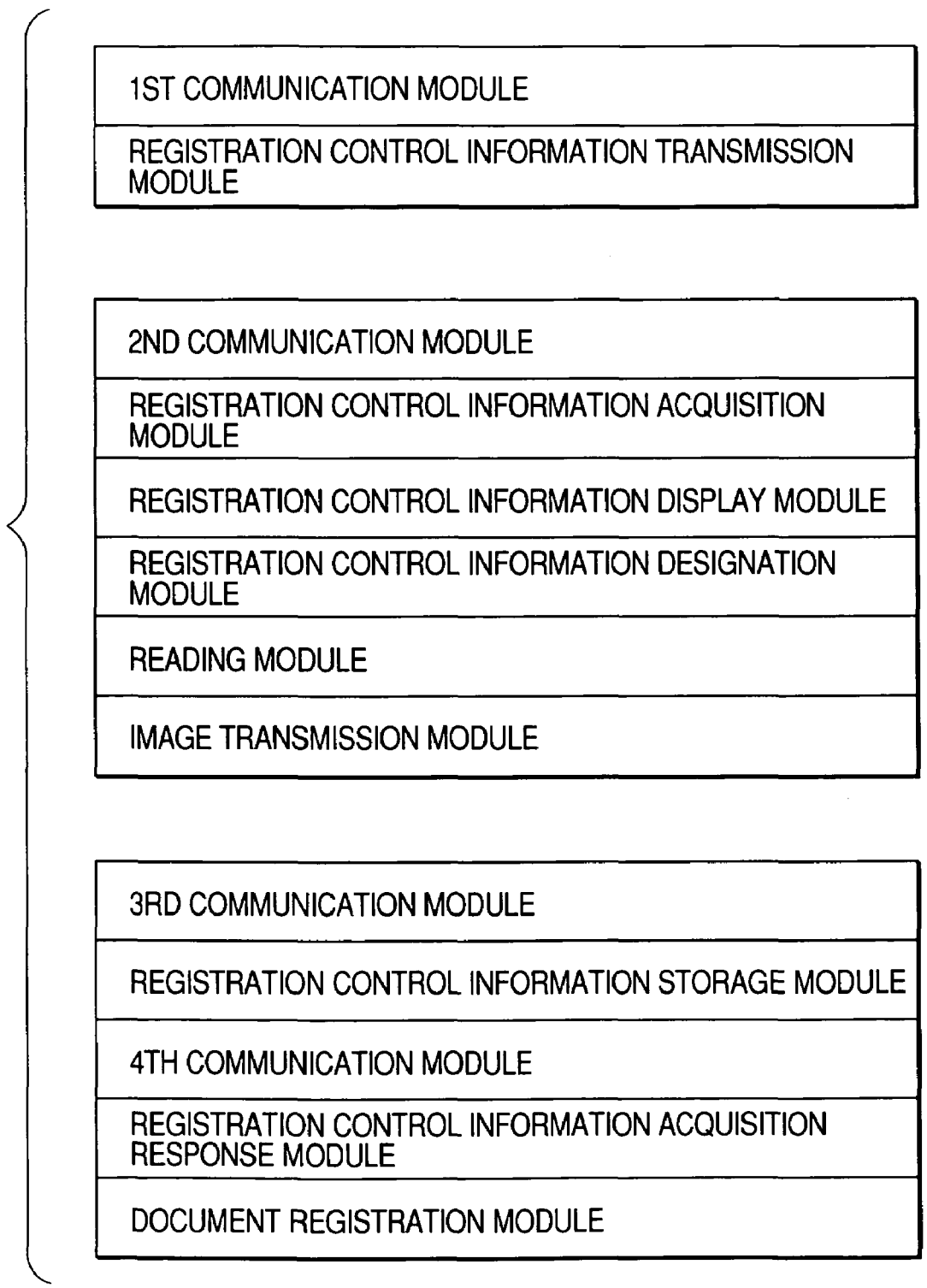
FIG. 15 is a view showing the structure of a recording medium storing a control program for controlling the document management system according to the first embodiment of the present invention.
Figure 16:
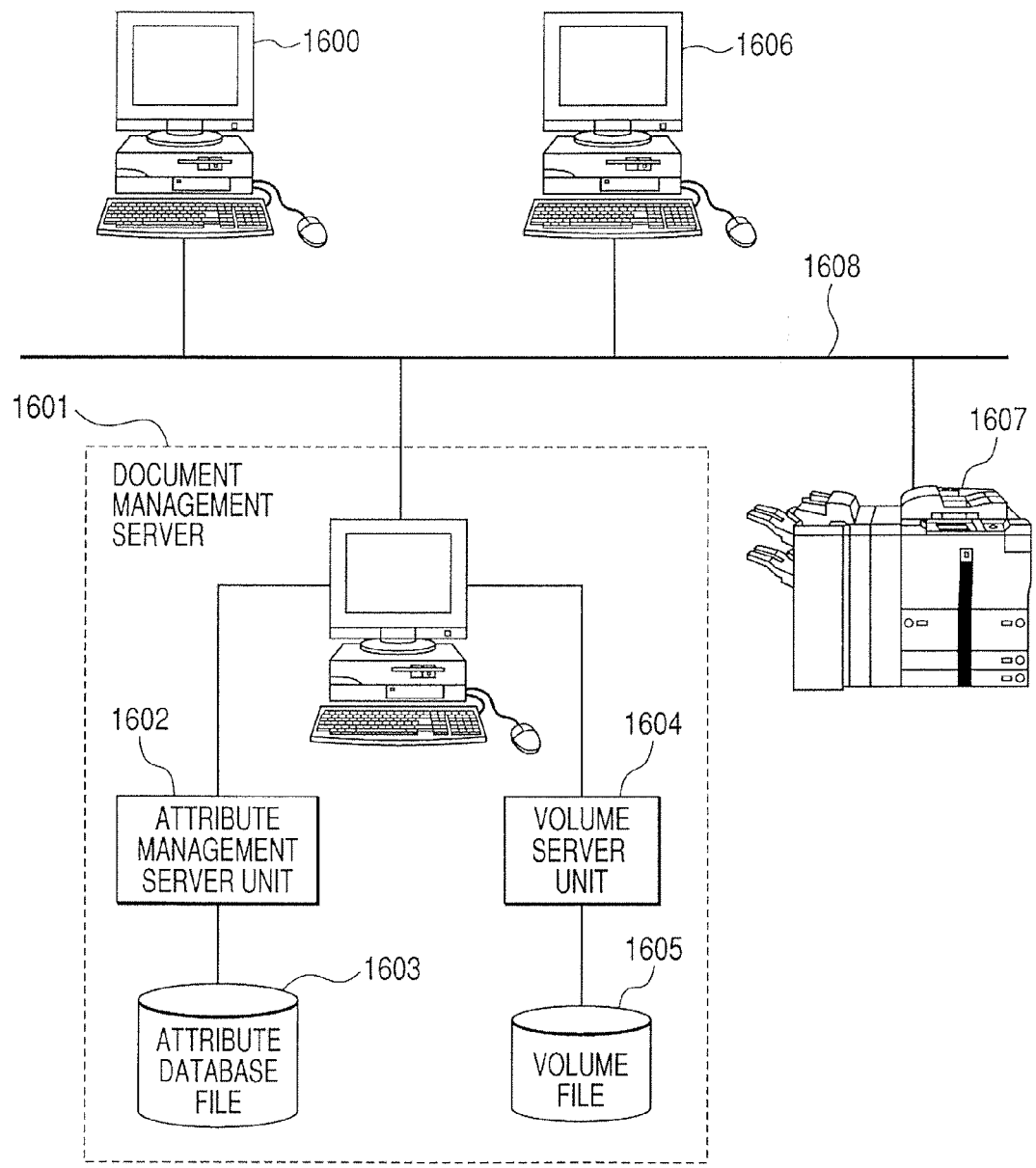
FIG. 16 is a block diagram showing the overall structure of a document management system in the prior art.

FIG. 15 is a view showing the structure of a recording medium storing a control program for controlling the document management system. The function of the first embodiment is achieved by installing the recording medium (i.e., a program) in the respective devices constituting the system of the first embodiment.

In FIG. 15, a first communication module is a program module of the document management client used for executing the information transference between the first communication module and the document management server through a communication network. A registration control information transmission module is a program module of the document management client used for creating the registration control information and transmitting the created information to the document management server.

A second communication module is a program module of the digital multifunctional device used for executing the information transference between the second communication module and the document management server. A registration control information acquisition module is a program module of the digital multifunctional device used for transmitting a registration control information acquisition request to the document management server and receiving the registration control information stored in the document management server. A registration control information display module is a program module of the digital multifunctional device used for displaying a registration control menu which indicates the contents of the received registration control information. A registration control information designation module is a program module of the digital multifunctional device used for designating the registration control information on the basis of an operation for the displayed registration control menu. The update of the registration control information by the designation and the modification can be properly executed. A reading module is a program module of the digital multifunctional device used for reading an original and generating image data. An image transmission module is a program module of the digital multifunctional device used for transmitting the designated registration control information and the generated image data to document management server.

A third communication module is a program module of document management server used for executing the information transference between the third communication module and the document management client. A registration control information storage module is a program module of the document management server used for storing the registration control information received from the document management client. A fourth module is a program module of the document management server used for executing the information transference between the fourth module and the digital multifunctional device. A registration control information acquisition response module is a program module of the document management server used for transmitting the stored registration control information to the digital multifunctional device on the basis of a registration control information acquisition request received from the digital multifunctional device. A document registration module is a program module of the document management server used for receiving the registration control information and the image data from the digital multifunctional device and storing the image data as the document on the basis of the registration control information.

(Specific Effect of First Embodiment)

As explained above, according the first embodiment, because creation and modification of the registration control information have only to execute from the document management client to the document management server, such an effect capable of easily executing the creation and the modification is obtained. Further, because the registration control information can be created and stored by associating with a user of the document management server or the folder. Furthermore, because a user acquires the registration control information associated with the user of the document management server currently operating or the folder and can designate desired registration control information among displayed information, such an effect capable of flexibly designating the registration control information by a simple operation from the digital multifunctional device is obtained.

Second Embodiment

Hereinafter, the second embodiment of the present invention will be explained in detail with reference to the attached drawings. Incidentally, it should be noted that the portion having the same function as that in the respective drawings is denoted by the same reference numeral and redundant explanation thereof will be omitted. Besides, it should be noted that the basic structure of the system according to the second embodiment is premised on the structure of the system according to the first embodiment. In the following, the functions concerning the features specific in the second embodiment will be mainly explained.

Figure 17:
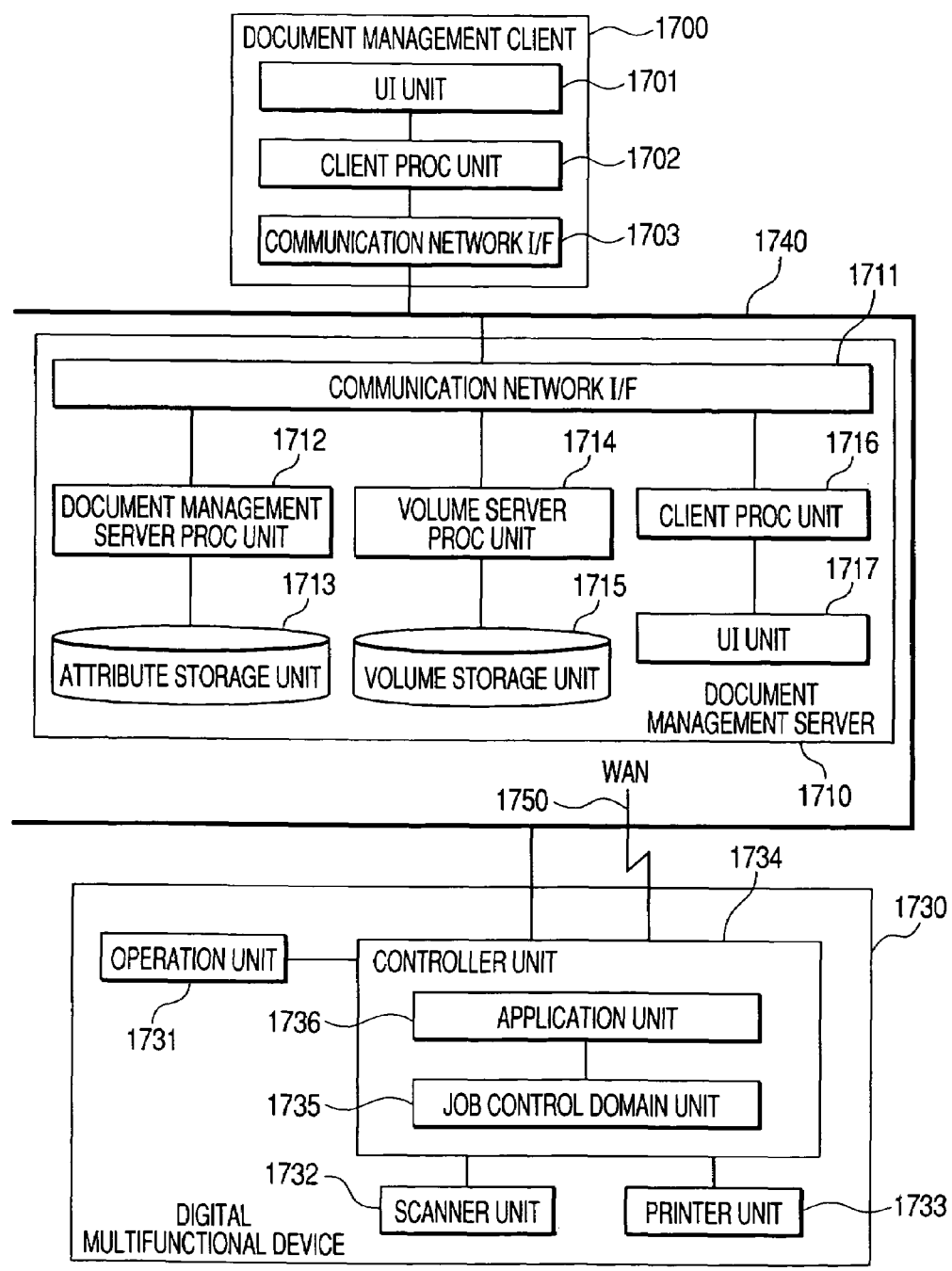
FIG. 17 is a view showing the overall structure of a document management system according to the second embodiment of the present invention.

FIG. 17 is a block diagram for explaining the overall structure of a document management system in the second embodiment of the present invention. In the following, the overall structure of the document management system according to the second embodiment will be explained. Incidentally, the document management system in the present embodiment consists of a document management client 1700 and a document management server 1710. Here, it should be noted that the document management client 1700 and the document management server 1710 may be provided as two independent personal computers mutually connected by a communication network 1740 as shown in the present embodiment, or may be provided as a single personal computer (not shown). Moreover, it should be noted that the document management client 1700 and the document management server 1710 are connected to a digital multifunctional device 1730 through the communication network 1740.

The document management client 1700 is a client of the document management system in the present embodiment, which integrally treats and processes documents managed by the document management server 1710 and documents managed by the digital multifunctional device 1730. Here, the document management client 1700 consists of a UI (user interface) unit 1701, a client processing unit 1702 and a communication network I/F 1703. The UI unit 1701 receives an indication (or an instruction) from a user concerned with execution of various functions of the document management client 1700 such as registration of the document, search for the document, display of the document, and the like, and supplies various information such as the processed results and the like to the user, and the UI unit 1701 consists of a display device represented by a CRT, a liquid crystal display or the like and an input device such as a keyboard or a pointing device. The client processing unit 1702, which consists of a CPU, a memory and the like, executes processes of the respective functions of the document management client 1700 such as registration of the document, search for the document, display of the document and the like. Moreover, the client processing unit 1702 transmits various request commands to the document management server 1710 and the digital multifunctional device 1730 in case of executing processes for the document management server 1710 and the digital multifunctional device 1730, and then receives responses for the request commands.

The document management server 1710 consists of a communication network I/F 1711, a document management server processing section, a volume server processing section, and a client processing unit 1716 and a UI unit 1717 which treat and process the processing requests from the devices. More specifically, the document management server processing section includes a document management server processing unit 1712 and an attribute storage unit 1713 to manage an inclusive relation of a folder, a document and a page and their attributes so that image data and document data can be managed as documents stored in hierarchical folders. The volume server processing section includes a volume server processing unit 1714 and a volume storage unit 1715 to store and manage real data such as document data and image data associated with a page in the document management server processing section. The communication network I/F 1711 which is connected to the communication network 1704 processes a communication network protocol such as the TCP/IP or the like and a protocol corresponding to a web service such as an SOAP/XML (Simple Object Access Protocol/eXtensible (extended) Markup Language) or the like.

The document management server processing unit 1712, which is organized by one task, receives a request command from the client processing unit 1702, executes the process such as the update, the search or the like to the attribute storage unit 1713, and then transmits the processed result to the client processing unit 1702. The attribute storage unit 1713, which stores a folder attribute, a document attribute, a page attribute and the like, is generally a hard disk or the like. The volume server processing unit 1714, which is organized by one task, receives a request command from the client processing unit 1702, executes a process such as update, data acquisition or the like to the volume storage unit 1715, and then transmits the processed result to the client processing unit 1702. The volume storage unit 1715, which stores document data and image data, is generally a hard disk or the like. The client processing unit 1716, which has the same function as that of the client processing unit 1702, transmits various request commands mainly in case of executing the processes to the digital multifunctional device 1730, and receives responses thereof.

The digital multifunctional device 1730 which acts as an image formation device having multiple functions such as a copy function, a scanner function, a printer function, a facsimile function and the like consists of an operation unit 1731 being a user interface, a scanner unit 1732 being an image input device, a printer unit 1733 being an image output device, and a controller unit 133. The operation unit 1731, the scanner unit 1732 and the printer unit 132 are respectively connected to the controller unit 1743, which is connected to the communication network (LAN) 1740 and a public line (WAN) 1750. The controller unit 1734 contains a job control domain unit 1735 and an application unit 1736. More specifically, the job control domain unit 1735 controls a scan process and a print job, and the application unit 1736 which has a communication network interface including protocols capable of dealing with the web service such as the SOAP/XML or the like transmits/receives various requests and responses to/from the document management client 1700 and the document management server 1710.

In the controller unit 1734, the image data read from the scanner unit 1732, the image data received from the public line (WAN) 1750 through the facsimile, and image data obtained by extracting a PDL code received from the communication network (LAN) 1740 into a bitmap image can be stored in the storage area, and the stored image data can be printed by the printer unit 1733 through the job control domain unit 1735 in response to an indication from the operation unit 1731 or an indication from the UI unit 1701 of the document management client 1700. Moreover, the application unit 1736, which has a connection interface with web services, receives the request commands from the client processing units 1702 and 1716, transmits the image data read from the scanner unit 1732 to the client processing units 1702 and 171, and causes the printer unit 1733 to print the image data acquired from the client processing units 1702 and 1716 through the job control domain unit 1735.

Figures 18, 18A:
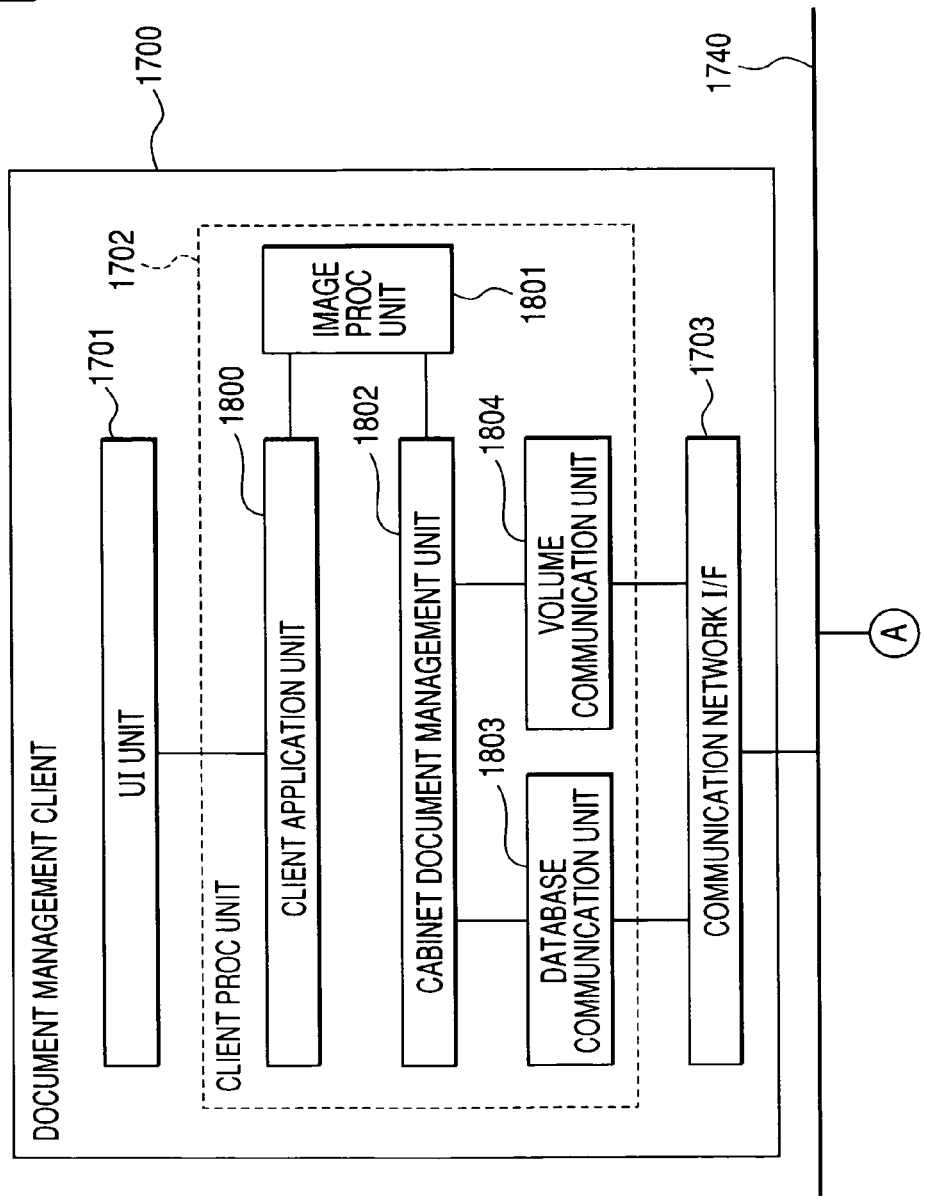
FIG. 18 is comprised of FIGS. 18A and 18B is a view showing the functional structure of the document management system according to the second embodiment of the present invention.
Figure 18B:
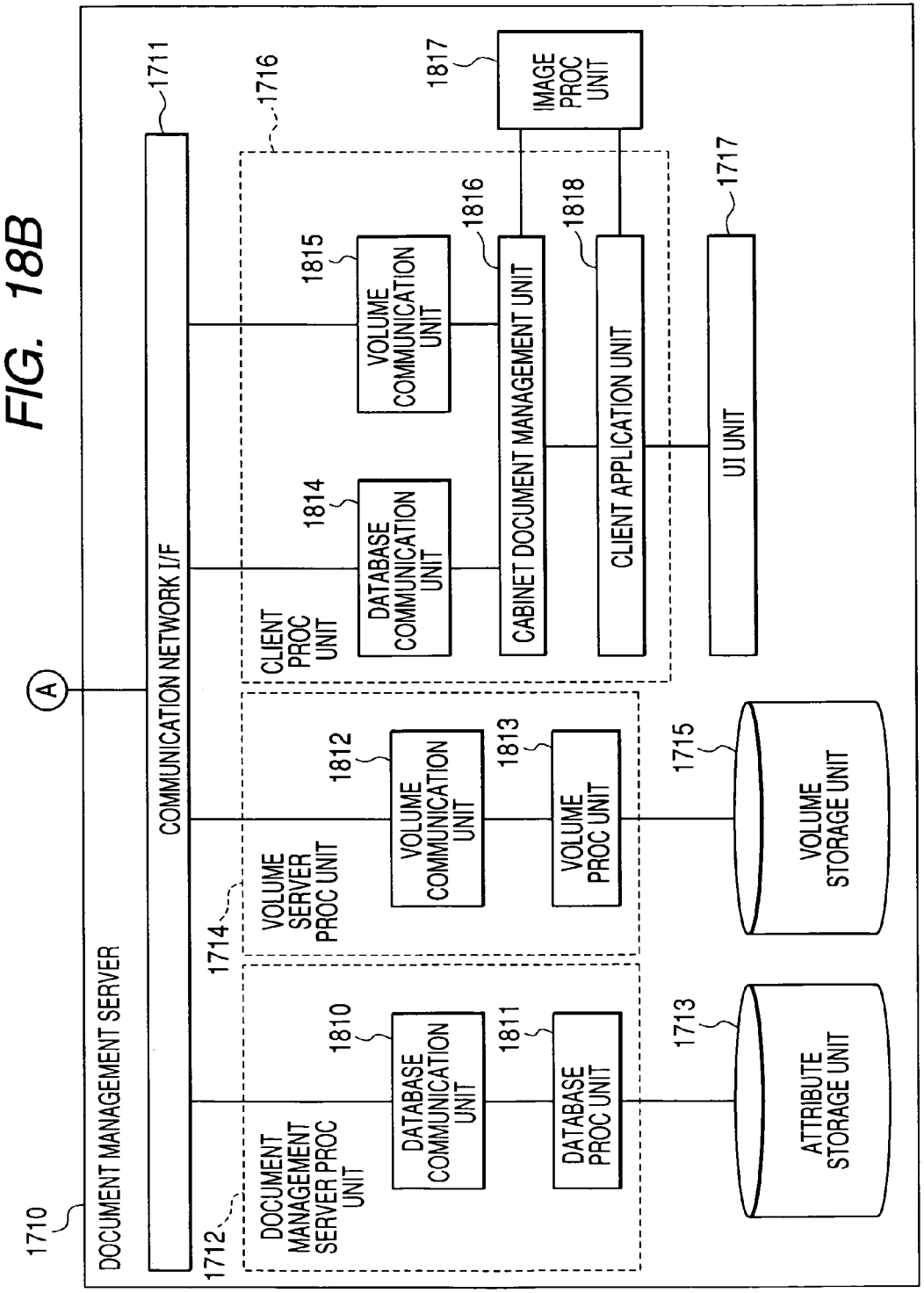

FIGS. 18A and 18B are views showing the functional structure of the document management system shown in FIG. 17. In FIGS. 18A and 18B, the client processing unit 1702 of the document management client 1700 consists of a client application unit 1800, an image processing unit 1801, a cabinet document management unit 1802, a database communication unit 1803, and a volume communication unit 1804. The client application unit 1800 executes processes of the respective functions of the document management client 1700 and also executes a control of the display screen of the UI unit 101, in response to indications from the UI unit 1701. Further, when processes for the document management server processing unit 1712 and the volume server processing unit 1714 are executed, the client application unit 1800 supplies the requests for the processes to the cabinet document management unit 1802 and receives the processed results thereof from the cabinet document management unit 1802. The image processing unit 1801 executes image processes such as expansion of image data, compression of image data, color space conversion, elimination of background noise, enlargement/reduction of image size, image rotation and the like in accordance with the requests from the client application unit 1800 and the cabinet document management unit 1802.

The cabinet document management unit 1802 can deal with the requests for the document management server 1710 with an object model organized by cabinet, folder, document and page. Then, when processes such as reference, update and the like for a folder attribute, a document attribute and a page attribute are executed, the cabinet document management unit 1802 supplies the requests for the processes to the database communication unit 1803, and receives the processed result from the database communication unit 1803. Moreover, when processes such as registration, deletion, acquisition and the like for the image data and the document data are executed, the cabinet document management unit 1802 supplies the requests for the processes to the volume communication unit 1804, and receives the processed results from the volume communication unit 1804. The database communication unit 1803 transmits a request command for the document management server processing unit 1712 to a database communication unit 1810 and receives a response command for the request from the database communication unit 1810, according to the SQL protocol defined on the TCP/IP. The volume communication unit 1804 transmits a request command for the volume server processing unit 1714 to a volume communication unit 1812 according to the RPC, and receives a response command for the request from the volume communication unit 1812.

Next, the document management server processing unit 1712 of the document management server 1710 consists of a database communication unit 1810 and a database processing unit 1811. When a request command for the document management server unit 1710 is received from the database communication unit 1803 according to the SQL protocol defined on the TCP/IP, the database communication unit 1810 supplies the request to the database processing unit 1811, and transmits the processed result of the request to the database communication unit 1803 as a response command. The database processing unit 1811, which is the RDBMS used for managing the inclusive relation of the folder, the document and the page and the attributes thereof, executes processes such as update or search to the attribute storage unit 1713 being a database file.

Besides, the volume server processing unit 1714 of the document management server 1710 consists of a volume communication unit 1812 and a volume processing unit 1813. When a request command for the document management server 1710 is received from the volume communication unit 1804 according to the RPC, the volume communication unit 1812 supplies the request to the volume processing unit 1813, and transmits the processed result for the request to the volume communication unit 1804 as a response command. The volume processing unit 1813 executes processes such as registration, deletion, acquisition and the like of the image data and the document data to the volume storage unit 1715.

The client processing unit 1716 of the document management server 1710 consists of a database communication unit 1814, a volume communication unit 1815, a cabinet document management unit 1816, an image processing unit 1817 and a client application unit 1818. Further, the client processing unit 1716 mainly communicates with the digital multifunctional device, and corresponds to the protocol capable of using the web service such as the SOAP/XML or the like. Here, it should be noted that, because the respective functions of the client processing unit 1716 are substantially the same as those of the client processing unit 1702 of the document management client 1700, the explanation thereof will be omitted.

Figure 19:
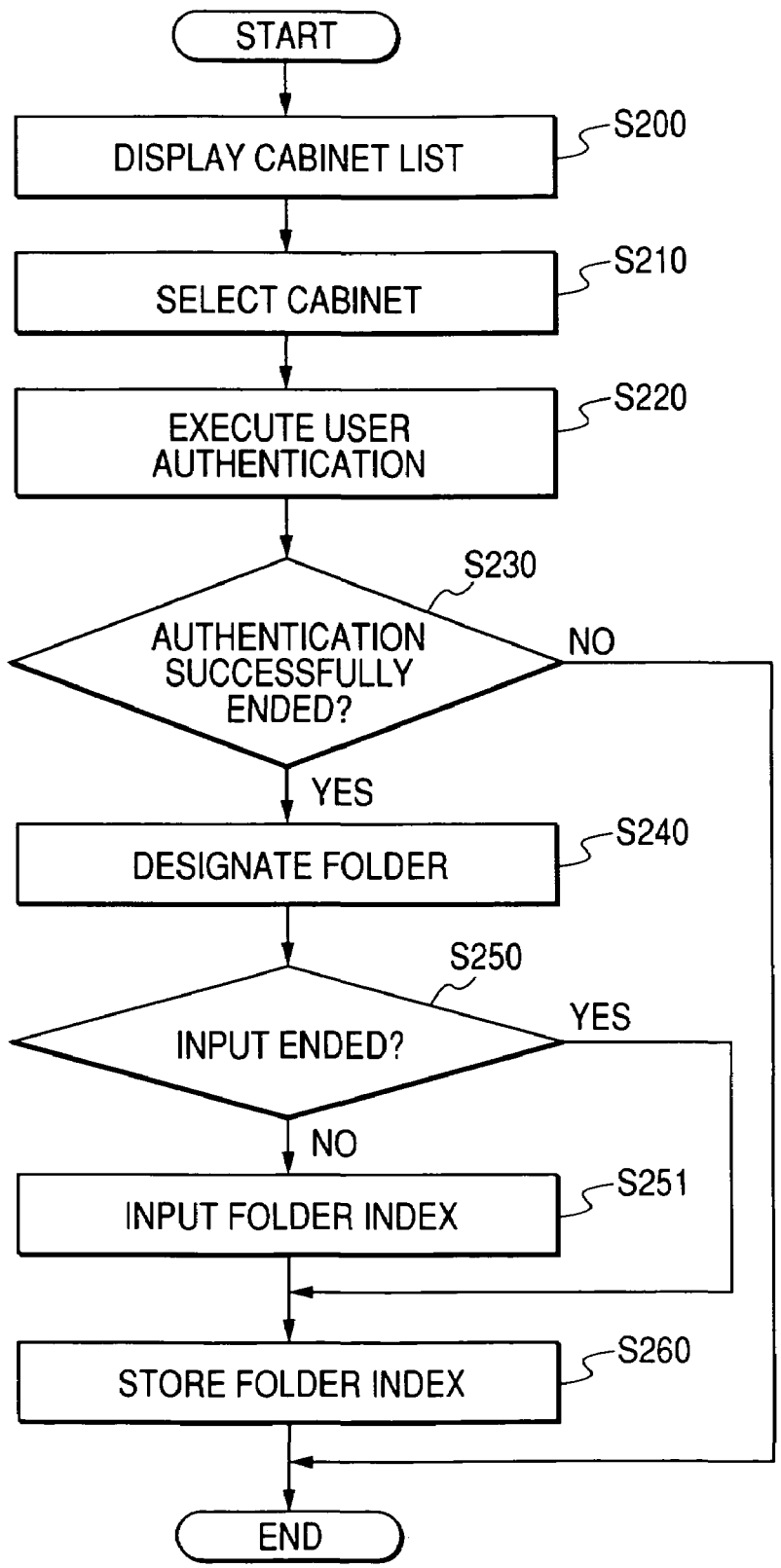
FIG. 19 is a flow chart for explaining the setting of a folder index executed in a document management server according to the second embodiment of the present invention.

FIG. 19 is a flow chart for explaining the setting of a folder index (document name information) executed in the document management server. Here, it should be noted that the relevant setting is executed on the document management server in response to an indication from the document management client 1700, and, in the present embodiment, the setting of the folder index should be previously executed before the document is registered in the folder of the document management server. Besides, in the present embodiment, an example that the index is set with respect to the folder is shown, whereby index information is stored in the folder. In addition, the index information may be stored on a user side or a cabinet. Here, the concrete operation in the latter case is basically the same as that in the former case (that is, the index information is stored in the folder), whereby the explanation of the latter case will be omitted.

First, the document management client 1700 displays a cabinet list of the document management server in a step S200, a user of the document management client 1700 selects a desired cabinet from the displayed cabinet list in a step S210, and the user of the document management client 1700 inputs an authentication code to execute user authentication in a step S220. Then, it is judged in a step S230 whether or not the user authentication is successfully ended. When judged that the user authentication is successfully ended, the process advances to a step S240. Meanwhile, when judged that the user authentication is not successfully ended, the process ends without executing any process.

In the step S240, the display of the folder list and the selection of the folder are repeatedly executed in the document management client 1700, whereby the user designates the desired folder. Then, in a step S250, it is confirmed by the user of the document management client 1700 whether or not to input the folder index. Then, the flow advances to a step S251 when confirmed to input the folder index, while the flow advances to a step S260 when confirmed not to input the folder index. In the step S251, the user of the document management client 1700 inputs the folder index to be stored in the folder designated in the step S240, through the operation unit of the UI unit 1701. Here, it should be noted that it is possible in this case to input plural folder indexes. Meanwhile, in the step S260, the document management server 1710 stores the input folder index in the designated folder.

Figure 20:
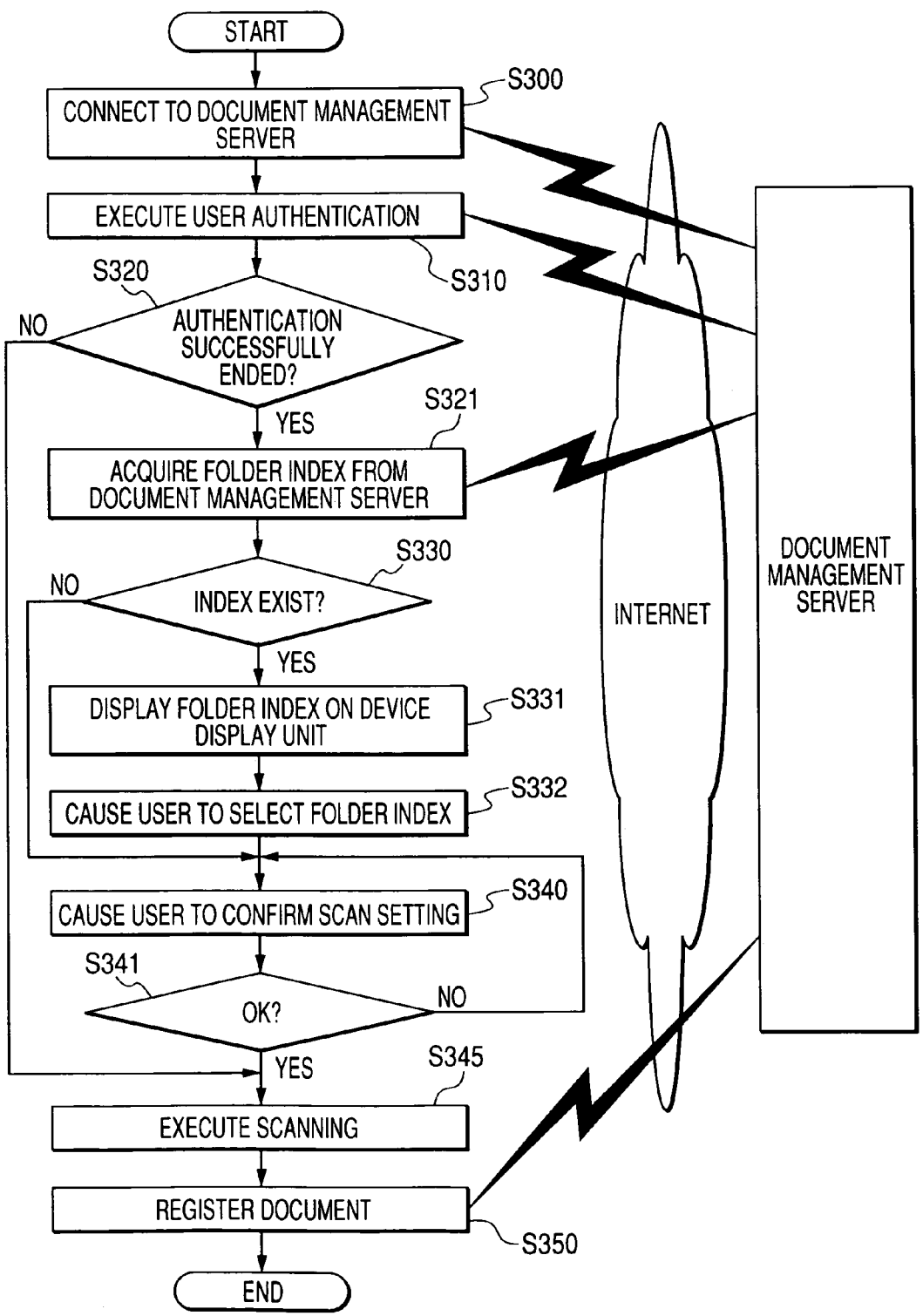
FIG. 20 is a flow chart for explaining the document registration executed to the document management server according to the second embodiment of the present invention.

FIG. 20 is a flow chart for explaining the document registration to be executed to the document management server. Here, it should be noted that the relevant document registration is executed to the document management server in response to an indication from the digital multifunctional device 1730. In the present embodiment, it is possible to effectively designate easy understandable document names because it is possible to easily designate the document names. In the following, as well as the example shown in FIG. 19, an example that the index is set with respect to the folder is shown. However, in addition to this, the index information may be stored on the user side or the cabinet, but the concrete operation thereof is basically the same as that in the case where the index information is stored in the folder, whereby the explanation thereof will be omitted.

In FIG. 20, the digital multifunctional device 1730 is connected with the document management server in a step S300. Then, the user authentication with respect to the user of the digital multifunctional device 1730 is automatically or manually executed in a step S310, and it is judged in a step S320 whether or not the User authentication is successfully ended. Thus, the flow advances to a step S321 when judged that the user authentication is successfully ended, while the process ends when judged that the user authentication is not successfully ended. In the step S321, the digital multifunctional device 1730 designates the folder by acquiring the folder list, and then acquires the information of the folder index set through the process shown in FIG. 19 from the document management server.

Next, it is judged in a step S330 whether or not the folder index is acquired in the step S321 (or whether or not the folder index exists). Thus, the flow advances to a step S331 when judged that the folder index is acquired, while the flow advances to a step S340 when judged that the folder index is not acquired, when judged that it fails in acquisition of the index information, or when judged that any index is not set beforehand. In the step S331, the digital multifunctional device 1730 causes the display unit of the operation unit 1731 to display the acquired folder index. Thus, in a step S332, the user selects, from the displayed folder index list, a character string that the user wishes to add to the document name.

In the step S340, the scan setting including the document name is wholly confirmed by the digital multifunctional device 1730. In this step, it is possible for the user to execute and change various settings such as document name editing, original size setting, scan resolution setting, and the like. It is then judged in a step S341 whether or not the user confirmation of the digital multifunctional device 1730 is ended. That is, the flow advances to a step S350 through a step S345 when judged that the setting is proper, while the flow returns to the step S340 when judged that the setting is improper. In the step S345, the digital multifunctional device 1730 scans an original. Then, in the step S350, document registration of the scanned image is executed to the document management server according to the designated scan setting.

Incidentally, according to another aspect, instead of the image data acquired by scanning the original, a document received through facsimile or an electronic mail may be once stored in a box (i.e., storage) of the digital multifunctional device in the step S345, and then transmitted to the document management server.

Figure 21:
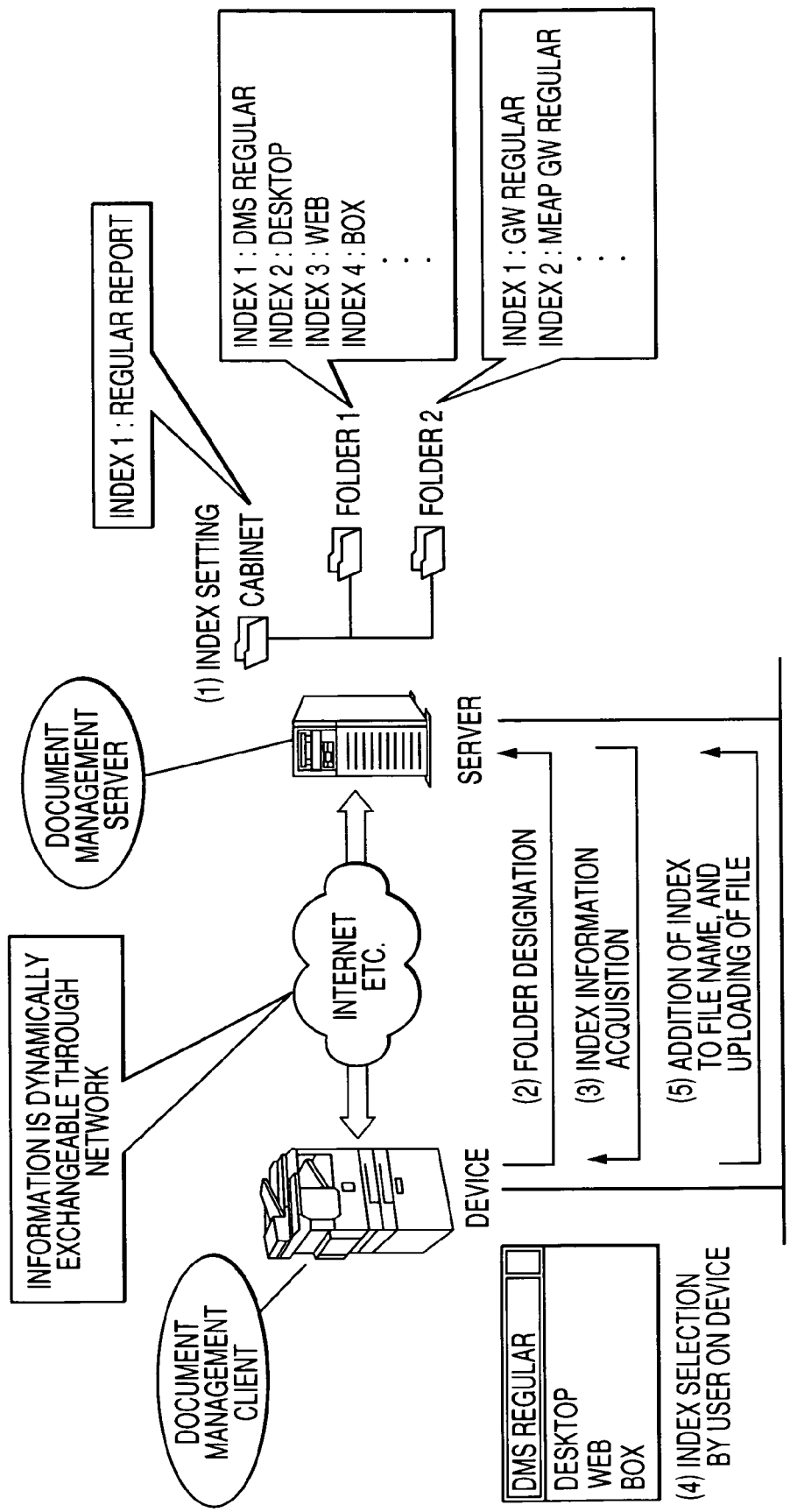
FIG. 21 is a view imaging the document registration according to the second embodiment of the present invention.

FIG. 21 is a view imaging the document registration according to the second embodiment of the present invention. In summary, the second embodiment of the present invention is characterized in that the digital multifunctional device 1730 and the document management server dynamically exchange the information through the communication network including the Internet, and in that the selection means is provided to the user by displaying the folder index on the digital multifunctional device 1730.

In the following, particularly, an example that the document name information is previously set in the cabinet or the folder will be explained. Here, it should be noted that the basic structure of a recording medium of storing a control program for controlling the system of the present embodiment is substantially the same as that of the first embodiment shown in FIG. 15. Thus, by installing the recording medium into each device constituting the system of the second embodiment, the function of the present embodiment is achieved. More specifically, the digital multifunctional device 1730 can transmit the request to the document management server, receive the response from the document management server, and display the received response on the display unit of the operation unit 1731. That is, it is said that the document management server is controlled by the digital multifunctional device 1730, whereby the display mode on the side of the document management client can be controlled through the operation from the digital multifunctional device 1730. More specifically, FIG. 21 shows the following procedures.

(1) The document name information (i.e., the index set in the process of FIG. 19) is previously set in the cabinet or the folder of the document management server.

(2) From the aspect of security, the user authentication is executed between the digital multifunctional device 1730 and the document management server. Then, the list of folders having access authority (i.e., folder list) is acquired from the document management server, the acquired folder list is displayed on an operation panel, and a desired folder is designated by the user. Here, the operations other than the user's folder designation operation are all executed automatically.

(3) The list of the document name information (i.e., indexes) set in the folder designated by the user is acquired.

(4) The acquired document name information (i.e., indexes) is displayed on the operation panel so as to provide the selection/editing means for the user.

(5) The document name information (i.e., index) selected and edited by the user is designated as the document name, and the designated document name information is transmitted to the document management server together with the image data.

Figure 22:
FIG. 22 is a view imaging an index storage condition according to the second embodiment of the present invention.

FIG. 22 is a view imaging an index storage condition according to the present embodiment. More specifically, FIG. 22 shows the storage condition of the index information within the attribute storage unit 1713 shown in FIG. 17. That is, the index information which is used as the document name is associated with the user ID, the cabinet ID and the folder ID, and the associated data are stored and managed. Besides, as an example of information to be associated with the user ID, the cabinet ID and the folder ID, it is possible to quote name information, creation date and time information, or the like. In any case, retrieving/searching can be achieved by holding the above information in the form of table.

(Specific Effect of Second Embodiment)

As explained above, according the second embodiment, it is possible to decrease, on the document management system, necessity of the document name editing which has been conventionally executed by the user with considerable trouble and time. Further, because the plural folder indexes (or cabinet indexes, or user indexes) are stored in the folder of the document management server, it is possible to automatically set different documents names in an identical storage-destination folder. Moreover, because the character string of the folder index (or cabinet index, or user index) is selected and edited on the digital multifunctional device 1730, it is possible to easily designate an optimum document name with minimum trouble.

(Overall Effects and Modifications)

According to the above embodiments of the present invention, it is possible to easily create and change the registration control information in the document management system. Further, it is possible from the device capable to transmitting the acquired image data to flexibly designate the registration control information through the simple operation.

Moreover, it is possible from the device capable to transmitting the acquired image data to easily designate the document name.

Incidentally, in the above embodiments, the system which is equipped with the three kinds of devices, i.e., the digital multifunctional device, the document management device and the document management client, is explained by way of example. According to such a configuration, it is possible to register the document data from the plural digital multifunctional devices, and it is also possible to browse the document data and the like from the plural document management clients. In any case, although there are some inconvenient situations in the system of the present embodiments, the number of devices to be connected on the network can be reduced by unifying the respective functions so as to improve the convenience of the overall system.

As described above, it is needless to say that the object of the present invention can be achieved also in a case where a storage medium storing therein program codes of software to realize the functions of the above embodiments is supplied to a system or an apparatus, and thus a computer (or CPU, or MPU) in the system or apparatus reads and executes the program codes stored in the medium.

In this case, the program codes themselves read out of the storage medium realize the functions of the above embodiments. Therefore, the storage medium of storing these program codes constitutes the present invention.

Here, as the storage medium from which the program codes are supplied, e.g., a flexible disk, a hard disk, an optical disk, a magnetooptical disk, a CD-ROM, a CD-R, a magnetic tape, a nonvolatile memory card, a ROM, an EEPROM and the like can be used.

Further, it is needless to say that the present invention includes not only a case where the functions of the above embodiments are realized by executing the program codes read by the computer, but also a case where an OS (operating system) or the like running on the computer executes a part or all of the actual processes on the basis of indications of the program codes and thus the functions of the above embodiments are realized by these processes.

Furthermore, it is needless to say that the present invention also includes a case where, after the program codes read out of the storage medium are written into the memory of a function expansion board inserted in the computer or the memory of a function expansion unit connected to the computer, a CPU or the like provided in the function expansion board or the function expansion unit executes a part or all of the actual processes on the basis of the indications of the program codes, and thus the functions of the above embodiments are realized by these processes.

Moreover, in case of using hardware, it is possible to realize the same functions as above by appropriately using the hardware and the software.

The present invention is not limited to the above embodiments, that is, various modifications (including organic combinations of the respective embodiments) of the present invention can be made without departing from the spirit and scope thereof, As described above, the present invention is explained with reference to the preferred embodiments, but the present invention is not limited to time. That is, various modifications are applicable within the range expected as defined in the appended claims.

This application claims priority from Japanese Patent Application No. 2003-414327 filed on Dec. 12, 2003, which is hereby incorporated by reference herein.

What is claimed is:

1. A control method for a document management system in which a document transmission device capable of transmitting acquired image data, a document management server of managing received image data by storing to a folder as a document, and a document management client of browsing the image data of the document stored in the document management server are connected to others through a network, the control method comprising:

a registration control information storage step, executed by the document management server, of receiving and storing registration control information for controlling a document registration process, from the document management client;

a registration control information acquisition response step, executed by the document management server, of transmitting the registration control information stored in said registration control information storage step to the document transmission device, on the basis of a registration control information acquisition request transmitted from the document transmission device;

a document registration step, executed by the document management server, of receiving, from the document transmission device, the registration control information designated from among the registration control information transmitted in said registration control information acquisition response step and the image data, and of storing the received image data as the document on the basis of the received registration control information;

a registration control information transmission step, executed by the document management client, of creating the registration control information and transmitting the created registration control information to the document management server;

a first user authentication step, executed by the document management client, of transmitting a user authentication request to the document management server and receiving an authentication result from the document management server, wherein, in said registration control information transmission step, the document management client transmits the created registration control information and user information authenticated in said first user authentication step to the document management server, when the authentication is successfully ended in said first user authentication step;

a registration control information acquisition request step, executed in the document transmission device, of transmitting the registration control information acquisition request to the document management server;

a registration control information acquisition step, executed in the document transmission device, of receiving the registration control information transmitted from the document management server in said registration control information acquisition response step;

a registration control information display step, executed in the document transmission device, of displaying a registration control menu showing a content of the registration control information received in said registration control information acquisition step;

a registration control information designation step, executed in the document transmission device, of designating the registration control information on the basis of an operation to the registration control menu displayed in said registration control information display step;

a data acquisition step, executed in the document transmission device, of acquiring the image data;

an image transmission step, executed in the document transmission device, of transmitting the registration control information designated in said registration control information designation step and the image data acquired in said data acquisition step, to the document management server; and a second user authentication step, executed in the document transmission device, of transmitting a user authentication request to the document management server and receiving an authentication result from the document management server, wherein, in said registration control information storage step, the document management server associates the registration control information received from the document management client in said registration control information transmission step with user information, and stores the registration control information and the user information associated with each other, and wherein, in said registration control information acquisition request step, the document transmission device transmits user information authenticated in said second user authentication step and the registration control information acquisition request to the document management server, when the authentication is successfully ended in said second user authentication step, and wherein, in said registration control information acquisition response step, the document management server transmits to the document transmission device the registration control information stored in association with the user information transmitted in said registration control information acquisition request step.

2. A control method according to claim 1, further comprising:

a first folder acquisition step, executed by the document management client, of transmitting a folder acquisition request to the document management server and receiving folder information from the document management server;

a first folder designation step, executed by the document management client, of displaying the folder information received in said first folder acquisition step and designating desired folder information;

a second folder acquisition step, executed by the document transmission device, of transmitting a folder acquisition request to the document management server and receiving folder information from the document management server; and a second folder designation step, executed by the document transmission device, of displaying the folder information received in said second folder acquisition step and designating desired folder information, wherein, in said registration control information transmission step, the document management client transmits the created registration control information and the folder information designated in said first folder designation step to the document management server, and wherein, in said registration control information storage step, the document management server associates the registration control information received from the document management client in said registration control information transmission step with the folder information, and stores the registration control information and the folder information associated with each other, and wherein, in said registration control information acquisition request step, the document transmission device transmits the folder information designated in said second folder designation step and the registration control information acquisition request to the document management server, and wherein, in said registration control information acquisition response step, the document management server transmits to the document transmission device the registration control information stored in association with the folder information transmitted in said registration control information acquisition request step.

3. A control method according to claim 1, wherein the document transmission device transmits the data acquired by reading an image on an original to the document management server.

4. A control method according to claim 1, wherein the document transmission device transmits the data acquired by reception from another device to the document management server.

5. A control method for a document management system in which a document transmission device capable of transmitting acquired image data, a document management server of managing received image data to a folder as a document, and a document management client of browsing the image data of the document stored in the document management server are connected to others through a network, the control method comprising:

a document name information storage step, executed by the document management server, of receiving and storing document name information being a document name at the time of document registration, from the document management client;

a document name information acquisition response step, executed by the document management server, of transmitting the document name information stored in said document name information storage step to the document transmission device, on the basis of a document name information acquisition request transmitted from the document transmission device;

a document registration step, executed by the document management server, of receiving, from the document transmission device, the document name information designated from among the document name information transmitted in said document name information acquisition response step and the image data, and of storing the received image data as the document on the basis of the received document name information;

a document name information transmission step, executed by the document management client, of creating the document name information and transmitting the created document name information to the document management server;

a first user authentication step, executed by the document management client, of transmitting a user authentication request to the document management server and receiving an authentication result from the document management server;

a first folder acquisition step, executed by the document management client, of transmitting a folder acquisition request to the document management server and receiving folder information from the document management server, when the authentication is successfully ended in said first user authentication step;

a first folder designation step, executed by the document management client, of displaying the folder information received in said first folder acquisition step and designating desired folder information;

a document name information acquisition request step, executed by the document transmission device, of transmitting the document name information acquisition request to the document management server;

a document name information acquisition step, executed by the document transmission device, of receiving the document name information transmitted from the document management server in said document name information acquisition response step;

a document name information display step, executed by the document transmission device, of displaying a document name menu showing a content of the document name information received in said document name information acquisition step;

a document name information designation step, executed by the document transmission device, of designating the document name information on the basis of an operation to the document name menu displayed in said document name information display step;

a data acquisition step, executed by the document transmission device, of acquiring the image data;

an image transmission step, executed by the document transmission device, of transmitting the document name information designated in said document name information designation step and the image data acquired in said data acquisition step, to the document management server;

a second user authentication step, executed by the document transmission device, of transmitting a user authentication request to the document management server and receiving an authentication result from the document management server;

a second folder acquisition step, executed by the document transmission device, of transmitting a folder acquisition request to the document management server and receiving folder information from the document management server, when the authentication is successfully ended in said second user authentication step; and a second folder designation step, executed by the document transmission device, of displaying the folder information received in said second folder acquisition step and designating desired folder information, wherein, in said document name information transmission step, the document management client transmits the created document name information and the folder information designated in said first folder designation step to the document management server, and wherein, in said document name information storage step, the document management server associates the document name information received from the document management client in said document name information transmission step with the folder information, and stores the document name information and the folder information associated with each other, and wherein, in said document name information acquisition request step, the document transmission device transmits the folder information designated in said second folder designation step and the document name information acquisition request to the document management server, and wherein, in said document name information acquisition response step, the document management server transmits to the document transmission device the document name information stored in association with the folder information transmitted in said document name information acquisition request step, 6. A control method according to claim 5, wherein the document transmission device transmits the data acquired by reading an image on an original to the document management server.

7. A control method according to claim 5, wherein the document transmission device transmits the data acquired by reception from another device to the document management server.

* * * * *